US011890859B2

(12) United States Patent
Asada et al.

(10) Patent No.: US 11,890,859 B2
(45) Date of Patent: Feb. 6, 2024

(54) SHEET HEATER, LIQUID DISCHARGE APPARATUS, AND PRINTER

(71) Applicants: Kohki Asada, Tokyo (JP); Kazuaki Kamihara, Tokyo (JP); Masato Ogawa, Kanagawa (JP); Hiroshi Sawase, Kanagawa (JP); Yoshihiro Takahashi, Tokyo (JP); Ryusaku Hida, Kanagawa (JP); Kenji Nozawa, Ibaraki (JP); Genichiroh Kawamichi, Ibaraki (JP)

(72) Inventors: Kohki Asada, Tokyo (JP); Kazuaki Kamihara, Tokyo (JP); Masato Ogawa, Kanagawa (JP); Hiroshi Sawase, Kanagawa (JP); Yoshihiro Takahashi, Tokyo (JP); Ryusaku Hida, Kanagawa (JP); Kenji Nozawa, Ibaraki (JP); Genichiroh Kawamichi, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 85 days.

(21) Appl. No.: 17/411,073

(22) Filed: Aug. 25, 2021

(65) Prior Publication Data

US 2022/0063300 A1 Mar. 3, 2022

(30) Foreign Application Priority Data

Aug. 27, 2020 (JP) ................................ 2020-143980
Jun. 15, 2021 (JP) ................................ 2021-099243

(51) Int. Cl.
*B41J 11/00* (2006.01)
*B41J 29/377* (2006.01)

(52) U.S. Cl.
CPC ......... *B41J 11/0015* (2013.01); *B41J 29/377* (2013.01)

(58) Field of Classification Search
CPC ............................ B41J 11/0015; B41J 29/377
See application file for complete search history.

(56) References Cited

U.S. PATENT DOCUMENTS 6,048,060 A 4/2000 Narushima et al.
9,010,920 B2 4/2015 Nishimura
(Continued)

FOREIGN PATENT DOCUMENTS

CN 207072185 U 3/2018
DE 10 2017 214 692 A1 3/2018
(Continued)

OTHER PUBLICATIONS

Extended European Search Report dated Jan. 19, 2022, in corresponding European Patent Application No. 21190291.1, 9 pages.
(Continued)

*Primary Examiner* — Justin Seo
(74) *Attorney, Agent, or Firm* — XSENSUS LLP

(57) ABSTRACT

A sheet heater includes a first conveyance belt configured to convey a sheet on which a liquid has been discharged in a conveyance direction, a heating unit facing the first conveyance belt, the heating unit configured to heat the sheet conveyed by the first conveyance belt, and a second conveyance belt disposed upstream of the first conveyance belt in the conveyance direction, the second conveyance belt configured to convey the sheet to the first conveyance belt. A surface temperature of the second conveyance belt is lower than a surface temperature of the first conveyance belt when the first conveyance belt and the second conveyance belt convey the sheet.

17 Claims, 16 Drawing Sheets

(56) References Cited

U.S. PATENT DOCUMENTS

| | | | |
|---|---|---|---|
| 2015/0336394 | A1* | 11/2015 | LeFevre ............... C10M 107/50 347/20 |
| 2016/0273832 | A1 | 9/2016 | Asada et al. |
| 2017/0266987 | A1 | 9/2017 | Asada et al. |
| 2017/0266988 | A1 | 9/2017 | Asada et al. |
| 2017/0266989 | A1 | 9/2017 | Ogawa et al. |
| 2017/0334218 | A1 | 11/2017 | Ogawa et al. |
| 2018/0016106 | A1 | 1/2018 | Asada et al. |
| 2018/0147878 | A1 | 5/2018 | Asada et al. |
| 2018/0264852 | A1 | 9/2018 | Ohtake et al. |
| 2019/0202215 | A1 | 7/2019 | Asada et al. |
| 2019/0204767 | A1 | 7/2019 | Ishihara et al. |
| 2019/0283470 | A1 | 9/2019 | Okayama |
| 2020/0290371 | A1 | 9/2020 | Ogawa |
| 2020/0290383 | A1 | 9/2020 | Ishihara et al. |
| 2021/0031542 | A1 | 2/2021 | Kamihara et al. |
| 2021/0053370 | A1 | 2/2021 | Numata |
| 2021/0197584 | A1 | 7/2021 | Asada et al. |
| 2021/0221149 | A1 | 7/2021 | Nakamura et al. |

FOREIGN PATENT DOCUMENTS

| | | | |
|---|---|---|---|
| EP | 1 859 939 | A1 | 11/2007 |
| EP | 2 712 737 | A1 | 4/2014 |
| JP | 2009-262517 | | 11/2009 |
| JP | 2010-125834 | A | 6/2010 |
| JP | 2010-201818 | | 9/2010 |
| JP | 2014-40053 | A | 3/2014 |
| JP | 2018-154500 | | 10/2018 |
| JP | 2020-152094 | | 9/2020 |
| JP | 2021-035761 | | 3/2021 |

OTHER PUBLICATIONS

Office Action dated Dec. 7, 2023 in European Patent Application No. 21 190 291.1, 6 pages.

* cited by examiner

SHEET HEATER, LIQUID DISCHARGE APPARATUS, AND PRINTER

CROSS-REFERENCE TO RELATED APPLICATIONS

This patent application is based on and claims priority pursuant to 35 U.S.C. § 119(a) to Japanese Patent Application No. 2020-143980, filed on Aug. 27, 2020, in the Japan Patent Office and Japanese Patent Application No. 2021-099243, filed on Jun. 15, 2021, in the Japan Patent Office, the entire disclosures of which are hereby incorporated by reference herein.

BACKGROUND

Technical Field

Aspects of the present disclosure relate to a sheet heater, a liquid discharge apparatus, and a printer.

Related Art

A printer applies a liquid onto a print target such as a sheet. The printer includes a heater to heat the sheet on which the liquid is applied to accelerate drying of the liquid applied on the sheet.

A printer heats the sheet onto which a liquid is applied while conveying the sheet with a conveyance belt.

SUMMARY

In an aspect of this disclosure, a sheet heater includes a first conveyance belt configured to convey a sheet on which a liquid has been discharged in a conveyance direction, a heating unit facing the first conveyance belt, the heating unit configured to heat the sheet conveyed by the first conveyance belt, and a second conveyance belt disposed upstream of the first conveyance belt in the conveyance direction, the second conveyance belt configured to convey the sheet to the first conveyance belt. A surface temperature of the second conveyance belt is lower than a surface temperature of the first conveyance belt when the first conveyance belt and the second conveyance belt convey the sheet.

BRIEF DESCRIPTION OF THE SEVERAL VIEWS OF THE DRAWINGS

The aforementioned and other aspects, features, and advantages of the present disclosure will be better understood by reference to the following detailed description when considered in connection with the accompanying drawings, wherein.

Figure 1:
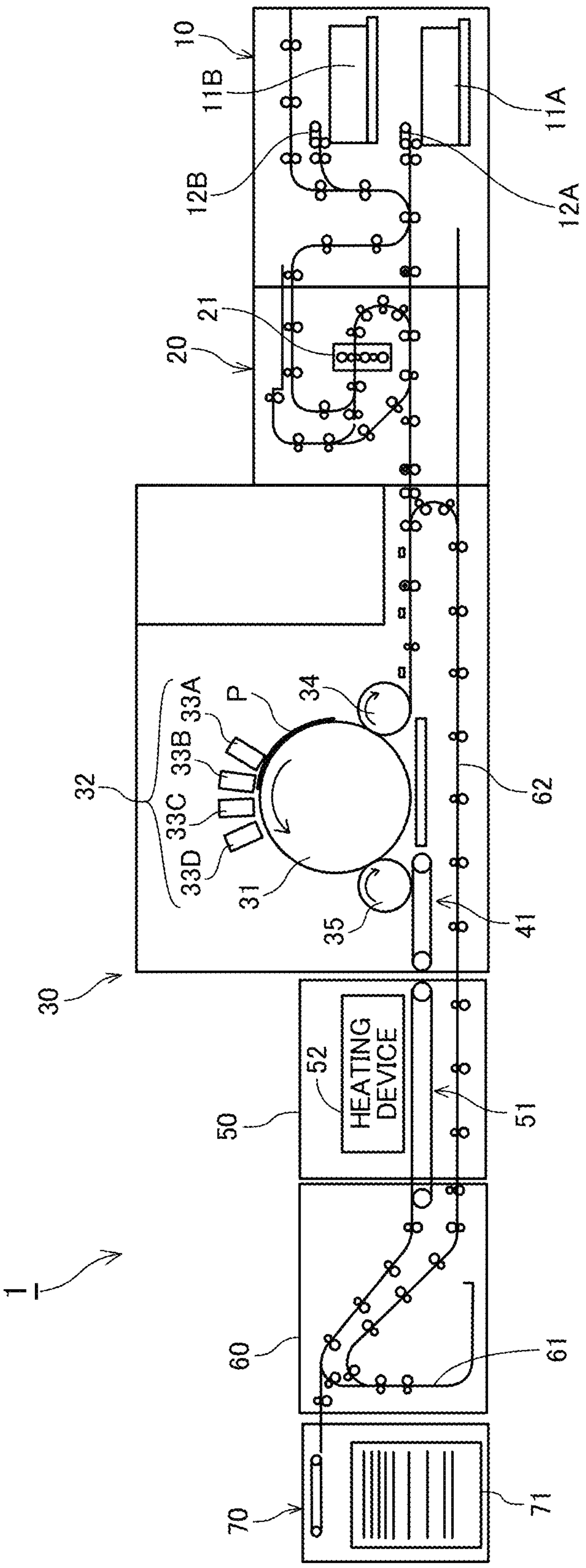
FIG. 1 is a schematic cross-sectional side view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable. As used herein, the singular forms "a", "an", and "the" are intended to include the plural forms as well, unless the context clearly indicates otherwise.

Referring now to the drawings, wherein like reference numerals designate identical or corresponding parts throughout the several views, embodiments of the present disclosure are described below. A printer 1 as a liquid discharge apparatus according to a first embodiment of the present disclosure is described with reference to FIGS. 1 and 2.

FIG. 1 is a schematic cross-sectional front view of the printer 1 according to the first embodiment of the present disclosure.

Figure 2:
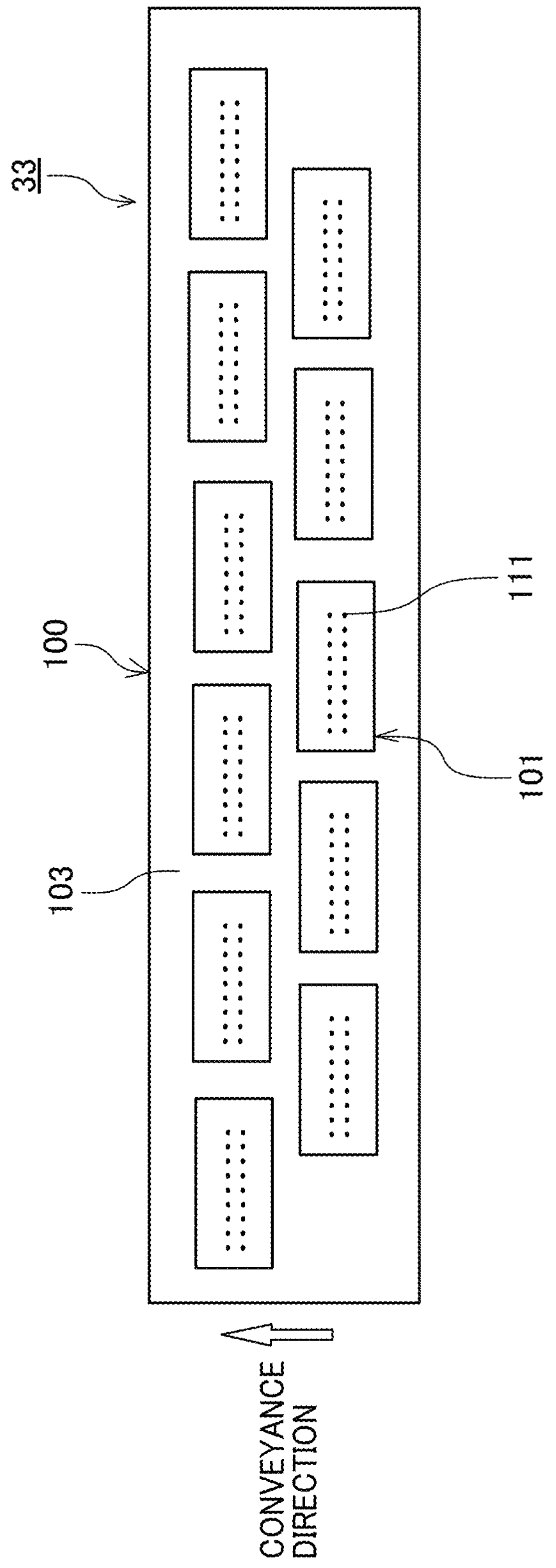
FIG. 2 is a plan view of a discharge unit of the printer.

FIG. 2 is a schematic plan view of a discharge unit 33 of the printer 1.

The printer 1 according to the first embodiment includes a loading unit 10 to load a sheet P into the printer 1, a pretreatment unit 20 as an applier, a printing unit 30, a dryer 50, a reverse mechanism 60, and an ejection unit 70.

In the printer 1, the pretreatment unit 20 applies, as required, a pretreatment liquid as an application liquid onto the sheet P fed (supplied) from the loading unit 10, and the printing unit 30 applies a desired liquid onto the sheet P to perform required printing.

After the printer 1 dries the liquid adhering to the sheet P by the dryer 50, the printer 1 ejects the sheet P to the ejection unit 70 without printing on a back surface of the sheet P through the reverse mechanism 60. The printer 1 may print on both sides of the sheet P via the reversing mechanism 60 after the printer 1 dries the liquid adhering to the sheet P by the dryer 50, and the printer 1 then ejects the sheet P to the ejection unit 70.

The loading unit 10 includes loading trays 11 (a lower loading tray 11A and an upper loading tray 11B) to accommodate a plurality of sheets P and feeding units 12 (a feeding unit 12A and a feeding unit 12B) to separate and feed the sheets P one by one from the loading trays 11, and supplies the sheets P to the pretreatment unit 20.

The pretreatment unit 20 includes, e.g., a coater 21 as a treatment-liquid application unit that applies a treatment liquid onto a printing surface of the sheet P to coat the printing surface of the sheet P with the treatment liquid having an effect of aggregation of ink particles to prevent bleed-through.

The printing unit 30 includes a drum 31 and a liquid discharge device 32. The drum 31 is a bearer (rotating member) that bears the sheet P on a circumferential surface of the drum 31 and rotates. The liquid discharge device 32 serves as a liquid application device and discharges a liquid toward the sheet P borne on the drum 31.

The printing unit 30 includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to a second conveyor 41.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position opposite (facing) the drum 31.

Similarly, the drum 31 includes a sheet gripper on a surface of the drum 31, and the leading end of the sheet P is gripped by the sheet gripper of the drum 31. The drum 31 includes a plurality of suction holes dispersed on a surface of the drum 31, and a suction unit generates suction airflows directed from desired suction holes of the drum 31 to an interior of the drum 31. The suction unit may be disposed inside the drum 31. The suction unit may also be coupled to the drum 31 with a tube and the like.

The sheet gripper of the drum 31 grips the leading end of the sheet P forwarded from the transfer cylinder 34 to the drum 31, and the sheet P is attracted to and borne on the drum 31 by the suction airflows by the suction device. As the drum 31 rotates, the sheet P is conveyed.

The liquid discharge device 32 includes discharge units 33 (discharge units 33A to 33D) to discharge liquids onto the sheet P as a liquid application unit. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K). Further, a discharge unit 33 may discharge a special liquid, that is, a liquid of spot color such as white, gold, or silver.

As illustrated in FIG. 2, for example, each of the discharge unit 33 includes a head module 100 including a full line head. The head module 100 includes a plurality of liquid discharge heads 101 arranged in a staggered manner on a base 103. Each of the liquid discharge head 101 includes a plurality of nozzle rows, and a plurality of nozzles 111 is arranged in each of the nozzle rows. Hereinafter, the liquid discharge head 101 is simply referred to as the “head 101”.

The printing unit 30 controls a discharge operation of each discharge unit 33 of the liquid discharge device 32 by a drive signal corresponding to print data. When the sheet P borne on the drum 31 passes through a region facing the liquid discharge device 32, the liquids of respective colors are discharged from the discharge units 33 toward the sheet P, and an image corresponding to the print data is printed on the sheet P.

The drum 31 forwards the sheet P to which a liquid is applied by the liquid discharge device 32 to the transfer cylinder 35 as a transfer rotator. The transfer cylinder 35 forwards the sheet P fed from the drum 31 to the second conveyor 41. The sheet is conveyed from the second conveyor 41 to the dryer 50 (heating unit). That is, the drum 31 is a conveyor that faces the discharge unit 33 as a liquid application unit and conveys the sheet P to which the liquid is applied toward the second conveyor 41 (the second conveyance belt 411).

The dryer 50 serving as a dryer includes a heating device 52. The dryer 50 heats and dries the sheet P, on which the liquid is applied, while conveying the sheet P fed from the second conveyor 41 by the first conveyor 51.

The reverse mechanism 60 includes a reverse part 61 and a duplex conveyor 62. The reverse mechanism 60 reverses the sheet P that has passed through the dryer 50 to dry a first surface of the sheet P onto which the liquid is applied when the printer 1 performs a duplex printing. The duplex conveyor 62 feeds the reversed sheet P back to upstream from the transfer cylinder 34 of the printing unit 30. The reverse part 61 reverses the sheet P by switchback manner.

The ejection unit 70 includes an ejection tray 71 on which a plurality of sheets P is stacked. The plurality of sheets P conveyed from the reverse mechanism 60 is sequentially stacked and held on the ejection tray 71.

In the present embodiment, an example in which the sheet is a cut sheet is described. However, embodiments of the present disclosure can also be applied to an apparatus using a continuous medium (web) such as continuous paper or roll paper, an apparatus using a sheet material such as wallpaper, and the like.

A sheet heater 500 according to a first embodiment of the present disclosure is described with reference to FIGS. 3 and 4.

Figure 3:
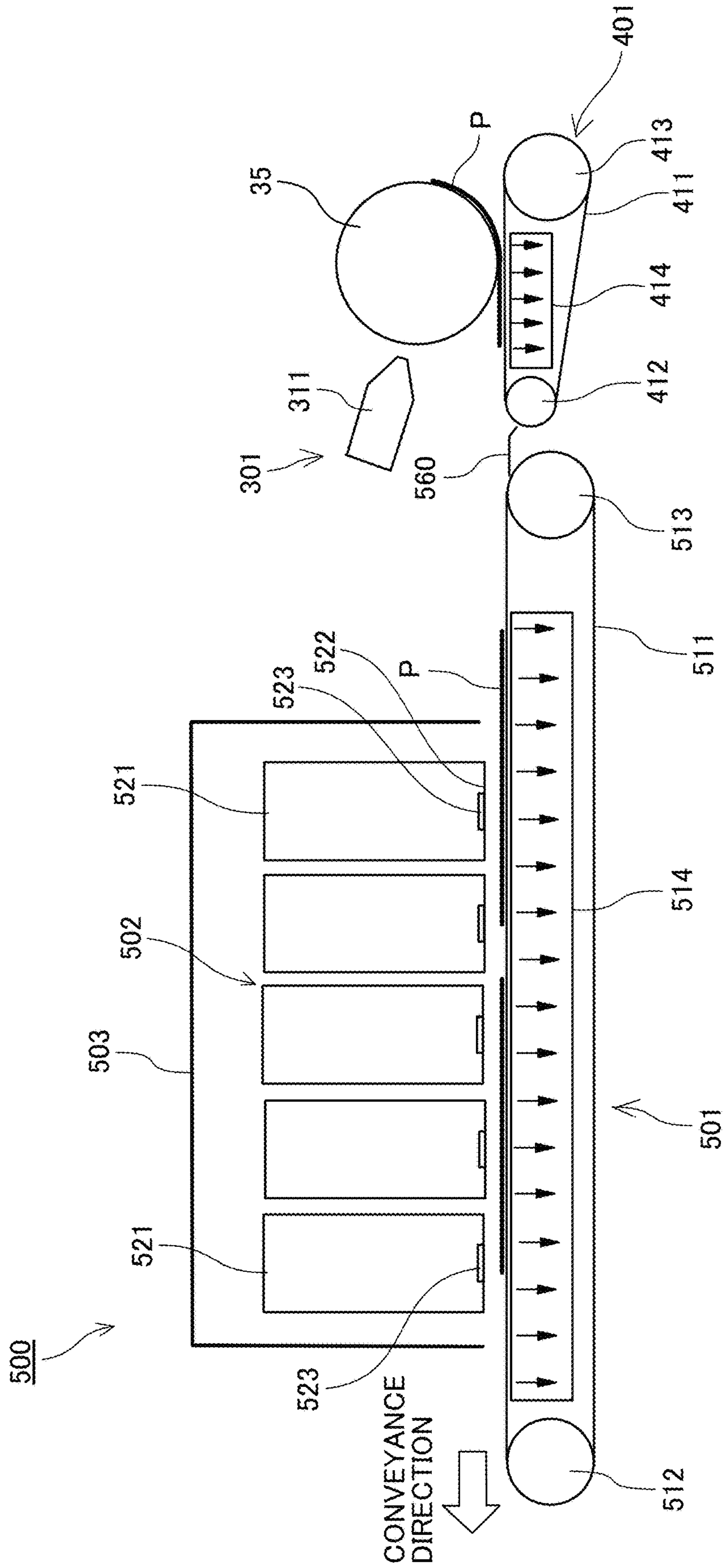
FIG. 3 is a schematic cross-sectional side view of a sheet heater according to the first embodiment of the present disclosure.

FIG. 3 is a schematic cross-sectional side view of the sheet heater 500 according to the first embodiment of the present disclosure.

Figure 4:
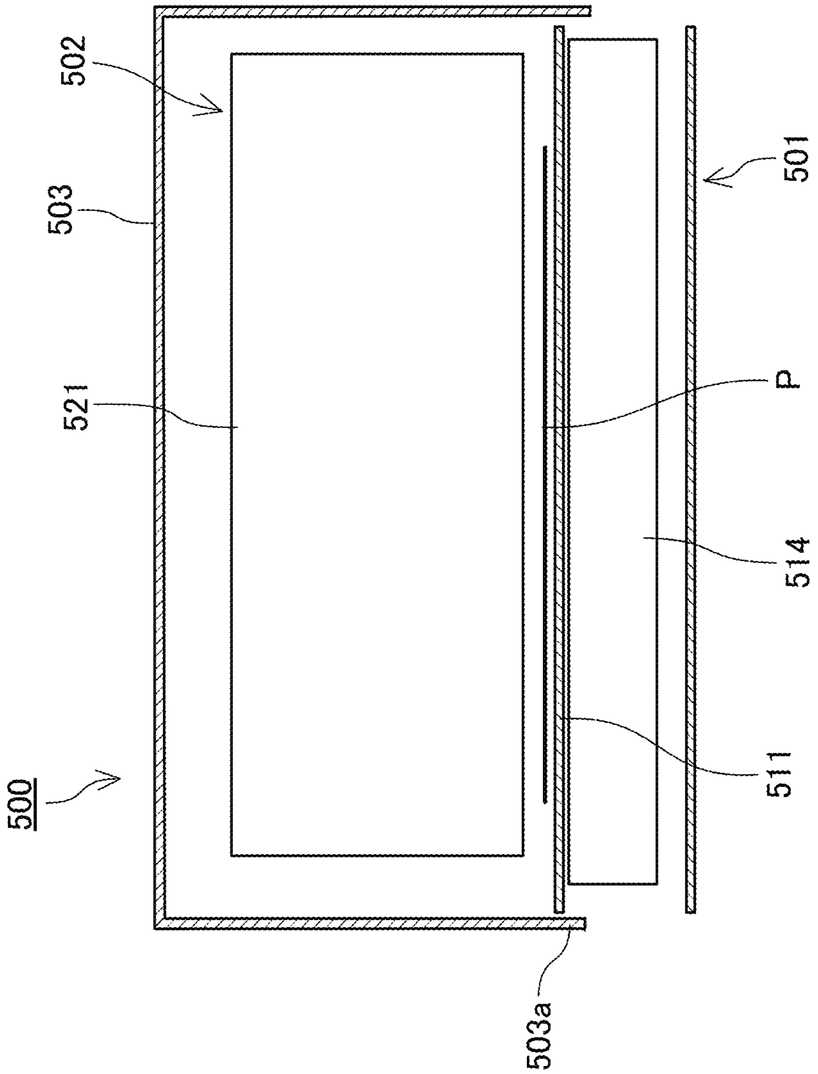
FIG. 4 is a schematic cross-sectional front view of the sheet heater of FIG. 1.

FIG. 4 is a schematic cross-sectional front view of the sheet heater 500 according to the first embodiment of the present disclosure.

The sheet heater 500 includes a first conveyance mechanism 501, a heating unit 502, a second conveyance mechanism 401, and a preheater 301. The first conveyance mechanism 501 serves as a first conveyor. The heating unit 502 also serves as a drying unit. The second conveyance mechanism 401 serves as a second conveyor.

The first conveyance mechanism 501 includes a first conveyance belt 511 that bears and conveys the sheet P. The first conveyance belt 511 is an endless conveyor. The first conveyance belt 511 is stretched between a drive roller 512 and a driven roller 513. That is, the first conveyance belt 511 is wound around the drive roller 512 and the driven roller 513. The first conveyance belt 511 orbits and rotates to move the sheet P.

The first conveyance belt 511 is a belt that includes a plurality of openings from which an air is sucked by a suction chamber 514 arranged inside the first conveyance belt 511. The suction chamber 514 serves as a suction mechanism. The first conveyance belt 511 may be, for example, a mesh belt, a plain weave belt having a suction hole, or the like.

The suction chamber 514 includes a suction blower, a fan, or the like to sucks the air through the plurality of openings in the first conveyance belt 511 to attract the sheet P to the first conveyance belt 511. The conveyor is not limited to the conveyor that uses suction method to attract the sheet P as described above. The conveyor may attract and convey the sheet P on the conveyor by, for example, an electrostatic adsorption method or a gripping method using a gripper.

The heating unit 502 includes a plurality of ultraviolet irradiators 521 disposed in a housing 503 along a "conveyance direction" of the sheet P as indicated by arrow in FIG. 3. The ultraviolet irradiators 521 irradiate the sheet P conveyed by the first conveyance belt 511 of the first conveyance mechanism 501 with ultraviolet rays to heat the sheet P.

As illustrated in FIG. 3, the housing 503 is arranged to have a gap with the first conveyance belt 511 in a vertical direction, and the gap is formed along the conveyance direction of the sheet P. As illustrated in FIG. 4, the housing 503 includes an extension portion 503*a* extended lower than first conveyance belt 511 in a vertical (height) direction perpendicular to the conveyance direction of the sheet P.

Next, an example of an effect of heat applied by the ultraviolet irradiator 521 on the ink on the sheet P is described with reference to FIGS. 5A and 5B. Temperature unevenness of the sheet P and a movement of a pigment contained in the liquid applied to the sheet P are described below with reference to FIGS. 5A and 5B.

Figure 5A:
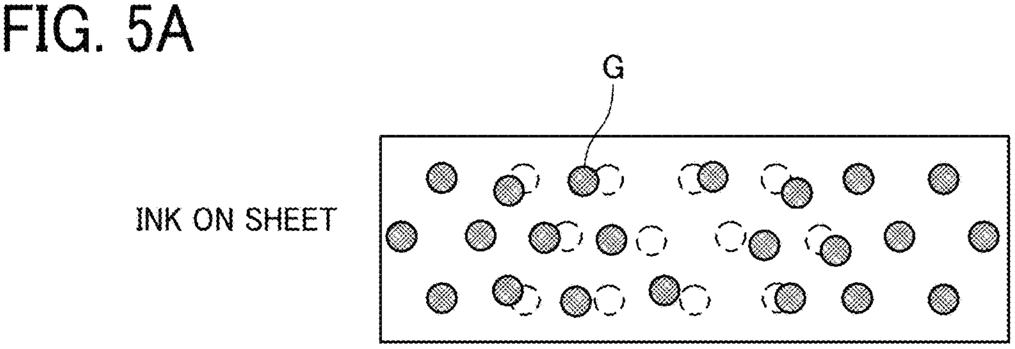
FIGS. 5A and 5B are schematic plan views of a sheet on which a liquid is applied to illustrate the movement of the pigment in the liquid.
Figure 5B:

FIGS. 5A and 5B are schematic plan views of the sheet P on which the liquid (ink) is applied to illustrate the movement of the pigment in the liquid (ink). FIG. 5 is a schematic perspective view of an example of the ultraviolet irradiator 521.

As illustrated in FIG. 3, the ultraviolet irradiator 521 includes granular ultraviolet light emitting diode elements 523 (UV-LED elements) arranged in a grid pattern on an irradiation surface 522 of the ultraviolet irradiator 521. Since the UV-LED elements 523 emit light at an identical illuminance, the ultraviolet irradiator 521 uniformly emits light along the irradiation surface 522 as a whole.

As a wavelength of the ultraviolet light (UV light), a wavelength having a peak wavelength of 395 nm and a wavelength distribution having a full width at half maximum of about 15 nm is used.

However, the wavelength and wavelength distribution of the ultraviolet light (UV light) is not limited the wavelength as described above and may be any other wavelength.

Thus, the ultraviolet irradiator 521 can obtain an effect of selectively heating only an image part (a part onto which the liquid is applied) and not excessively raising a temperature of a blank part (a part onto which the liquid is not applied).

A result of comparison between the UV-LED elements 523 and an infrared heater (infrared lamp) is illustrated below. The infrared heater (infrared lamp) is also referred to as an IR heater (IR lamp).

A surface temperature of the sheet P after the sheet P has passed through the dryer is measured while heating conditions (output settings of the IR lamp and the UV-LED elements 523) are varied to measure the temperatures of the image part and the blank part. When the temperature of the image part rises to around 90° C., moisture and solvent in a water-based ink evaporated and dried.

When the IR lamp heats the sheet P with a setting in which the temperature of the image part in the sheet P becomes 90° C., the temperature of the blank part in the sheet P becomes 105° C. at the same time of heating the image part.

Conversely, when the UV-LED elements 523 heats the sheet P with the setting in which the temperature of the image part becomes 90° C. as in a case of the IR lamp, the temperature of the blank part in the sheet P becomes 45° C. that is about 60° C. lower than the temperature of the blank part heated by the IR lamp.

Due to such a difference in the temperature of the blank part, moisture content of the blank part decreased from 6.1% to 1.4% by the heating of the IR lamp, whereas the moisture content of the blank part decreased only from 6.1% to 2.9% in the heating of the UV-LED elements 523. That is, it was confirmed that the sheet P can retain more moisture in the blank part of the sheet P after the sheet P is heated (dried) by the ultraviolet ray emitted from the UV-LED elements 523.

Referring back to FIG. 3, the second conveyance mechanism 401 is disposed upstream from the first conveyance belt 511. The second conveyance mechanism 401 serves as the second conveyor 41 in FIG. 1. The first conveyance mechanism 501 serves as the first conveyor 51 in FIG. 1.

Thus, the sheet heater 500 includes parts of the dryer 50 such as the heating device 52 and the first conveyor 51 and parts of the printing unit 30 such as transfer cylinder 35 and the second conveyor 41 in FIG. 1.

The second conveyance mechanism 401 includes the second conveyance belt 411 that bears and conveys the sheet P. The second conveyance belt 411 is an endless conveyor. The second conveyance belt 411 is stretched between a drive roller 412 and a driven roller 413. The second conveyance belt 411 orbits and rotates to move the sheet P.

The second conveyance belt 411 is a belt that includes a plurality of openings from which an air is sucked by a suction chamber 414 arranged inside the second conveyance belt 411. The second conveyance belt 411 may be, for example, a mesh belt, a plain weave belt having a suction hole, or the like.

The suction chamber 414 includes a suction blower, a fan, or the like to sucks the air through the plurality of openings in the second conveyance belt 411 to attract the sheet P to the second conveyance belt 411. The conveyor is not limited to the conveyor that uses suction method to attract the sheet P as described above. The conveyor may attract and convey the sheet P on the conveyor by, for example, an electrostatic adsorption method or a gripping method using a gripper.

The second conveyance mechanism 401 includes a guide 560 between the second conveyance belt 411 and the first conveyance belt 511. The guide 560 servers as a guide to guide the sheet P from the second conveyance belt 411 to the first conveyance belt 511.

The second conveyance mechanism 401 includes a preheater 301 that heats at least one of the sheet P and the transfer cylinder 35 before the sheet P, onto which the liquid has been applied, is conveyed from the transfer cylinder 35 to the second conveyance belt 411.

The preheater 301 is a non-contact heater to heat the sheet P in a non-contact manner. The preheater 301 includes an air blower 311 to blow warm air toward the transfer cylinder 35. The air blower 311 includes a heater and a temperature detection sensor. Thus, the air blower 311 can set a temperature of the warm air blown from the air blower 311 from a normal temperature to about 100° C.

The air blower 311 is preferably used with turning off the heater or used at a low temperature from a viewpoint of reducing cockling of the sheet P. The temperature of the warm air is arbitrarily set based on information such as the amount of liquid adhered onto the sheet P and a type of the sheet P (paper type).

Next, temperature unevenness of the sheet P and a movement of a pigment contained in the liquid applied to the sheet P are described below with reference to FIGS. 5A and 5B, and FIG. 6.

FIGS. 5A and 5B are schematic plan views of the sheet P on which the liquid (ink) is applied to illustrate the movement of the pigment in the liquid (ink).

Figure 6:
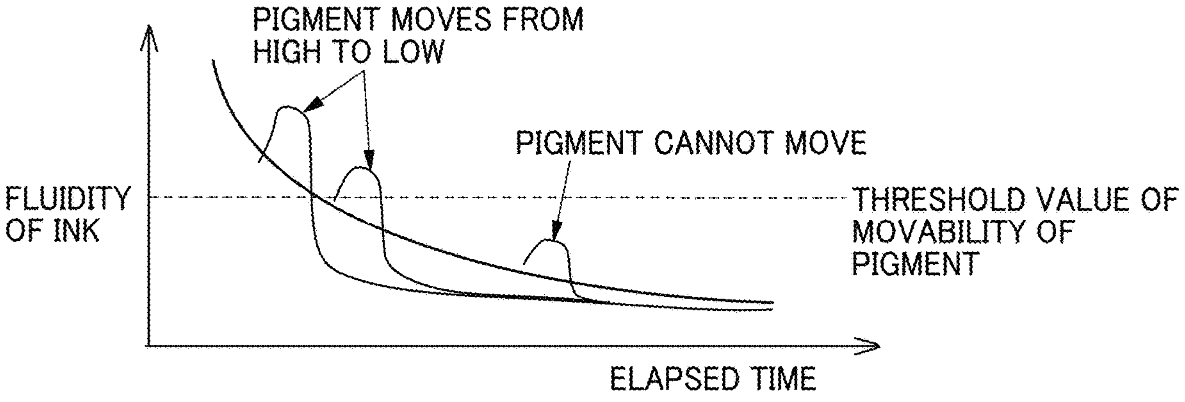
FIG. 6 is a graph illustrating a relation between an elapsed time and ink fluidity.

FIG. 6 is a graph illustrating a relation between an elapsed time and ink fluidity.

In a drying process of ink as a liquid, processes of discharge of ink from the head 101, landing of the ink on the sheet P, permeation of the ink into the sheet P, and evaporation of the ink from the sheet P proceed. The pigment in the ink is fixed to the sheet P (the pigment does not move) during a period from the landing of the ink on the sheet P to the permeation and evaporation of the ink in the above processes.

Immediately after the ink lands on the sheet P, the pigment in the ink is still in an easily movable state. When the pigment moves, the color density appears to be different to human eyes. Therefore, it is necessary to reduce the movement of the pigment after the ink lands on the sheet P in order to obtain a target image quality.

Here, when the temperature of the ink is high, the ink fluidity becomes high. Therefore, as illustrated in FIG. 5B for example, a difference in a surface tension occurs due to Marangoni convection or the like when temperature unevenness (temperature gradient) is generated in an in-plane direction of the sheet P.

The temperature unevenness is a phenomenon in which a temperature in a central portion of the sheet P is relatively higher than a temperature at both ends of the sheet P. Then, the pigment G moves from a high temperature portion to a low temperature portion (from a dotted circle position to a black circle position). As a result, an amount of pigment in the low temperature portion increases. Thus, the color density in the high temperature portion is recognized as light, and the color density in the low-temperature portion is recognized as dark.

As illustrated in FIG. 6, the ink fluidity also depends on the elapsed time. In other words, the evaporation of the ink in the sheet P proceeds, viscosity of the ink increases, and the ink fluidity decreases with the elapse time. At this time, if the pigment has fluidity equal to or higher than a certain threshold value, the pigment can move. Thus, the density unevenness is recognized in an actual image on the sheet P.

Therefore, if there is a temperature difference in a portion of the sheet P contacting the ink when the ink fluidity is high, the pigment moves from a portion of the sheet P with a high temperature toward a portion sheet P with a low temperature as illustrated in FIG. 5A. The ink fluidity is high immediately after the ink is applied onto the sheet P.

To prevent this phenomenon of pigment movement, it is necessary to perform following processes.

(1) Eliminating the temperature unevenness of a portion of the sheet P contacting the ink.

(2) Rapidly lowering the ink fluidity of the ink on the sheet P to a fluidity equal to or lower than a fluidity threshold at which the pigment movement can occur.

The printer 1 according to the first embodiment applies the pretreatment liquid onto the sheet P to prevent the pigment movement and further preforms the preheating to promote evaporation and penetration of the ink before the sheet P comes into contact with the conveyor (second conveyance belt 411), thereby increasing the viscosity in the ink. The preheater 301 has to control a temperature increase in the preheater 301 as much as possible in a preheating process since the temperature of the sheet P increases with excessive increase in the temperature of the preheater 301.

Next, an operation of the sheet heater 500 according to the first embodiment is described below.

The preheater 301 dries the sheet P until the pigment contained in the liquid applied to the sheet P does not move and forwards the sheet P to the second conveyance belt 411 as described above as illustrated in FIGS. 3 to 6 in the present embodiment.

Since no heat source is disposed around the second conveyance belt 411, the surface temperature of the second conveyance belt 411 is approximately equal to an internal temperature of the sheet heater 500. Thus, the surface temperature of the second conveyance belt 411 is equal to an ambient temperature or slightly higher than the ambient temperature at which the sheet heater 500 is disposed. Thus, the surface temperature of the second conveyance belt 411 is equal to or higher than the ambient temperature and lower than the surface temperature of the first conveyance belt 511.

Therefore, the sheet P forwarded to the second conveyance belt 411 is conveyed in a normal temperature environment. The normal temperature (room temperature) is substantially from 5° C. to 35° C.

Since the temperature of the second conveyance belt 411 is reduced (lower than the temperature of the first conveyance belt 511), the sheet heater 500 can reduce the movement of the pigment in the ink on the sheet P and can also reduce an occurrence of cockling of the sheet P.

Then, the sheet P is conveyed from the second conveyance belt 411 to the first conveyance belt 511. The ultraviolet irradiator 521 irradiates the sheet P conveyed by the first conveyance belt 511 with ultraviolet rays. Thus, the liquid (ink) on the sheet P is heated by the ultraviolet irradiator 521 and dried to the final image quality.

As described above, the sheet heater 500 in the first embodiment includes the second conveyance belt 411 disposed upstream from the first conveyance belt 511. The second conveyance belt 411 conveys the sheet P onto which the liquid is applied. The first conveyance belt 511 conveys the sheet P heated by the heating unit 502. The sheet P is conveyed by the second conveyance belt 411 in a state in which a belt surface temperature of the second conveyance belt 411 is lower than the belt surface temperature of the first conveyance belt 511.

Thus, the surface temperature of the second conveyance belt 411 is lower than the surface temperature of the first conveyance belt 511 when the first conveyance belt 511 and the second conveyance belt 411 convey the sheet P.

Thus, the sheet P onto which the liquid has been applied is first conveyed by the second conveyance belt 411 having a relatively low temperature (lower than the temperature of the first conveyance belt 511). The fluidity of the liquid of the sheet P decreases to such a degree in which the movement of the pigment does not occur.

Then, the sheet P is conveyed to the first conveyance belt 511 that conveys the sheet P heated by the heating unit 502. Even when the temperature of the first conveyance belt 511 is high, the pigment in the liquid on the sheet P does not move. Thus, the sheet heater 500 can reduce the density unevenness of the image on the sheet P and improve the image quality.

That is, the temperature of the first conveyance belt 511 that conveys the sheet P increases due to heat applied by the heating unit 502. Here, the temperature of the first conveyance belt 511 does not decrease even when the first conveyance belt 511 returns to a position of the transfer cylinder 35 by circulation movement of the first conveyance belt 511 when the first conveyance belt 511 is configured to directly receive the sheet P from the transfer cylinder 35. Thus, a high temperature state of the first conveyance belt 511 may be maintained.

At this time, the sheet P onto which the liquid is applied comes into contact with the first conveyance belt 511 having high temperature in a state in which the pigment in the liquid on the sheet P is likely to move as described above. Thus, the pigment in the liquid on the sheet P may move and the density unevenness of the image on the sheet P may occur to deteriorate the image quality.

Therefore, the sheet heater 500 in the first embodiment includes the second conveyance belt 411 disposed between the transfer cylinder 35 and the first conveyance belt 511. Thus, the sheet heater 500 according to the first embodiment can reduce the ink fluidity to a degree in which the pigment in the liquid (ink) on the sheet P does not move to reduce the density unevenness of the image on the sheet P.

A sheet heater 500 according to a second embodiment of the present disclosure is described with reference to FIG. 7.

Figure 7:
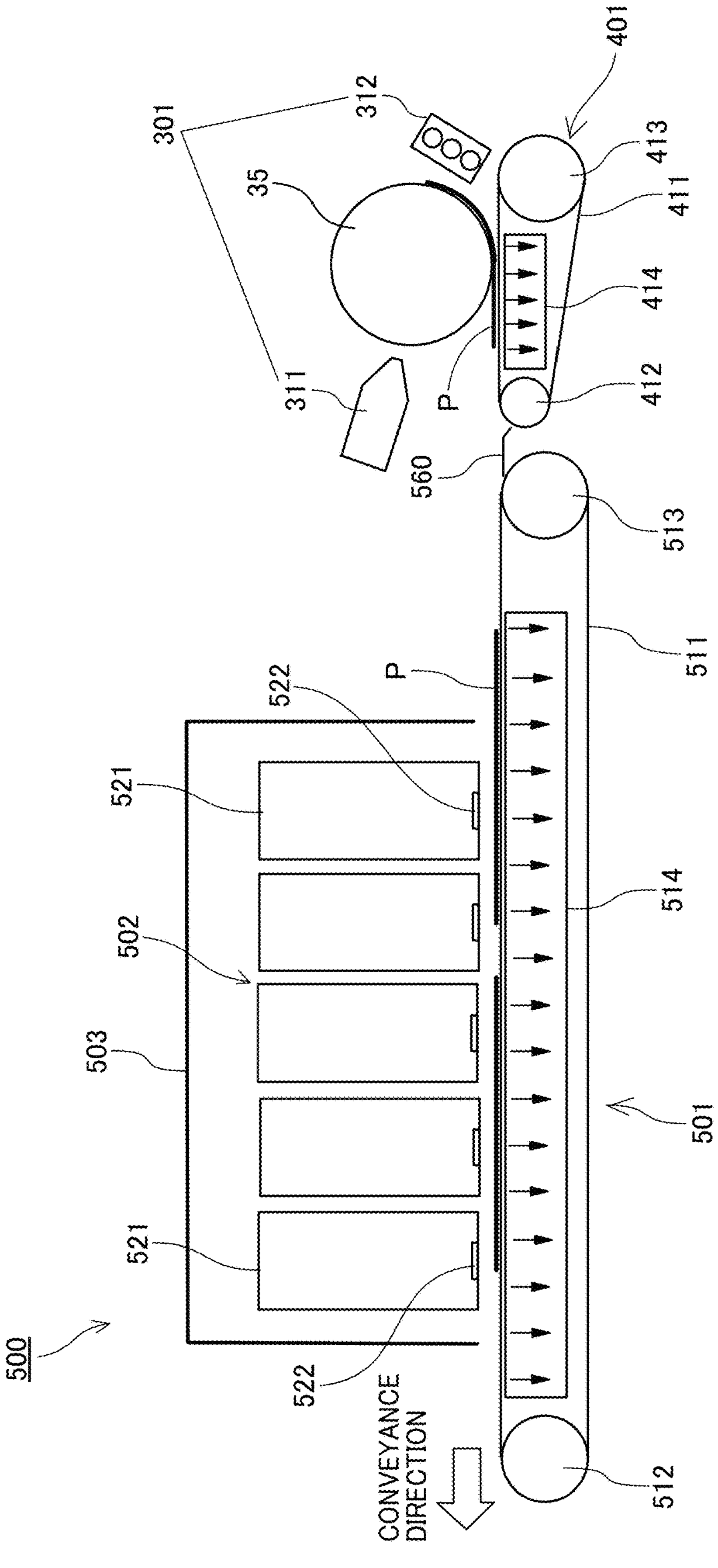
FIG. 7 is a schematic cross-sectional side view of a sheet heater according to a second embodiment of the present disclosure.

FIG. 7 is a schematic cross-sectional side view of the sheet heater 500 according to the second embodiment of the present disclosure.

The sheet heater 500 according to the second embodiment includes the preheater 301 that includes the air blower 311 and an infrared irradiator 312. The infrared irradiator 312 irradiates the sheet P conveyed by the transfer cylinder 35 with infrared rays to heat the sheet P.

Thus, the sheet heater 500 according to the second embodiment can dry the sheet P conveyed from the transfer cylinder 35 to the second conveyance belt 411 earlier than the sheet heater 500 in the first embodiment. Thus, the sheet heater 500 can further effectively reduce the movement of the pigment in the liquid (ink) on the sheet P.

Thus, the transfer cylinder 35 is between the drum 31 and the second conveyance belt 411, and the transfer cylinder 35 is configured to convey the sheet P from the drum 31 to the second conveyance belt 411. The preheater 301 faces the transfer cylinder 35, and the preheater 301 is configured to heat the sheet P upstream of the second conveyance belt 411.

The preheater 301 includes the air blower 311 configured to blow air toward the transfer cylinder 35, and the infrared irradiator 312 disposed opposite to the air blower 311 via the transfer cylinder 35. The infrared irradiator 312 is configured to heat the sheet P with infrared ray.

A sheet heater 500 according to a third embodiment of the present disclosure is described with reference to FIG. 8.

Figure 8:
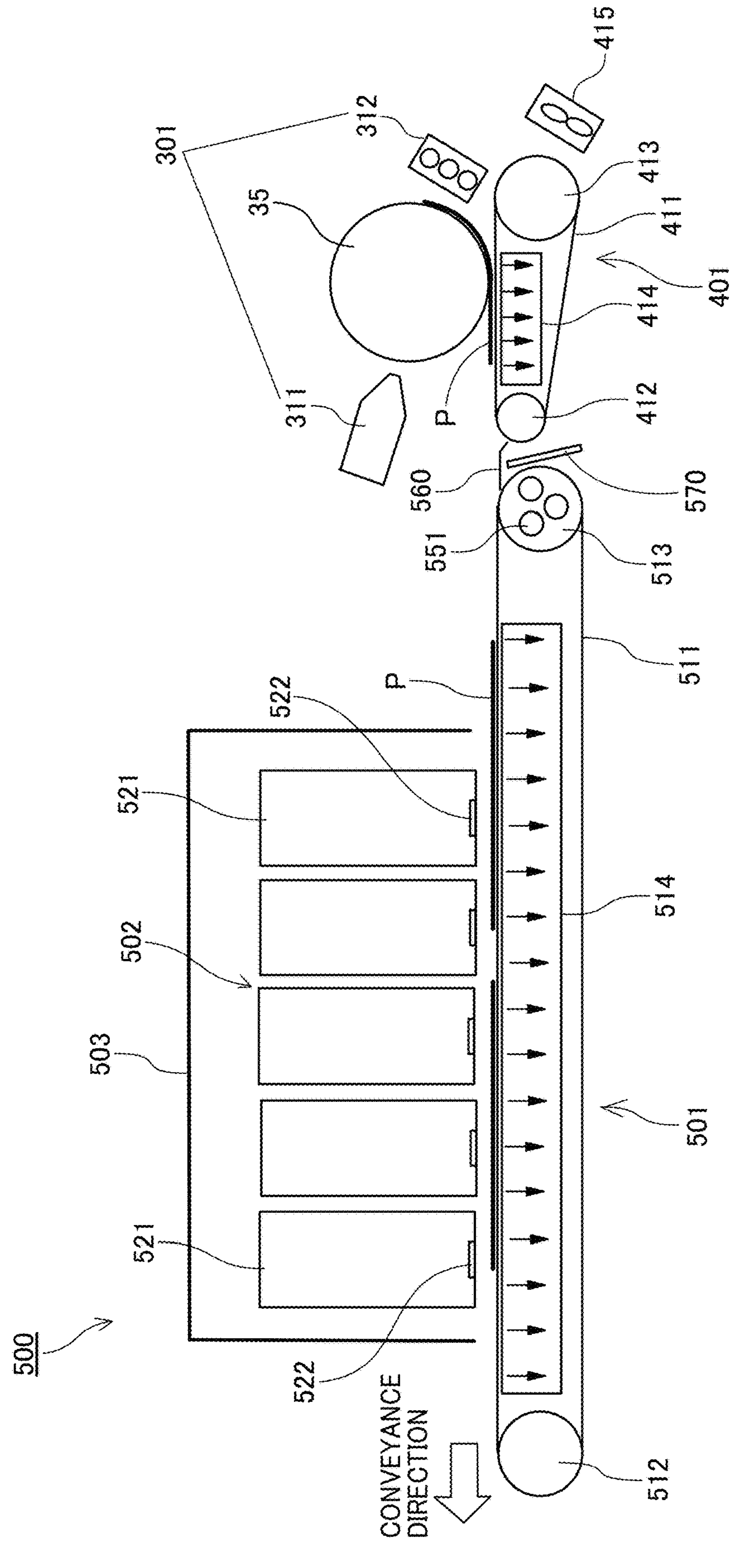
FIG. 8 is a schematic cross-sectional side view of a sheet heater according to a third embodiment of the present disclosure.

FIG. 8 is a schematic cross-sectional side view of the sheet heater 500 according to the third embodiment of the present disclosure.

The sheet heater 500 according to the third embodiment includes a heating element 551 inside the driven roller 513. The driven roller 513 is a rotating body around which the first conveyance belt 511 is wound. The heating element 551 heats the driven roller 513. The heating element 551 is, for example, a heater including an infrared heater (IR lamp) or the like. The heating element 551 heats an interior of the driven roller 513 to heat the first conveyance belt 511 contacting with the driven roller 513.

Thus, the sheet heater 500 includes two or more rollers (the drive roller 512 and the driven roller 513) around which the first conveyance belt 511 is wound, and a heating element 551 inside the at least one of the two or more rollers (the drive roller 512 and the driven roller 513), the heating element 551 is configured to heat said at least one of the two or more rollers (the drive roller 512 and the driven roller 513).

An infrared heater as the heating element 551 is, for example, a carbon heater, a tungsten heater, a halogen heater, a ceramic heater, and the like. However, the heating element 551 is not limited to the heaters as described above and may be any other types of heaters. Further, the heating element 551 disposed inside the driven roller 513 can efficiently transfer heat of the heating element 551 to a surface of the driven roller 513 in an outer peripheral direction without leaking of the heat.

In the sheet heater 500 according to the third embodiment, the sheet P fed onto the first conveyance belt 511 from upstream of the first conveyance belt 511 is attracted to the first conveyance belt 511 by suction force generated by the suction chamber 514.

The heating element 551 inside the driven roller 513 heats the driven roller 513 so that the heating element 551 heats a portion of the first conveyance belt 511 that passes from the driven roller 513 to the housing 503.

Thus, the sheet P attracted to and contacted with the first conveyance belt 511 receives heat transferred from the first conveyance belt 511, and the temperature of the sheet P increases.

The plurality of ultraviolet irradiators 521 of the heating unit 502 irradiate the sheet P with ultraviolet rays so that the ink as a liquid applied to the sheet P absorbs the ultraviolet rays. The pigment in the ink generates heat that evaporates solvent and moisture in the ink and dries the ink.

In the above-described way, the sheet heater 500 can efficiently heat the ink on the sheet P since the pigment in the liquid (ink) generates heat while the temperature of the sheet P rises by the heat transferred from the first conveyance belt 511 to the sheet P.

The sheet heater 500 according to the third embodiment includes a heat insulator 570 serving as a heat shield. The heat insulator 570 is disposed between the second conveyance belt 411 and the first conveyance belt 511. The second conveyance belt 411 and the first conveyance belt 511 are thermally separated from each other.

The sheet heater 500 further includes a cooling fan 415 to blow air to the second conveyance belt 411. The cooling fan 415 brings the temperature of the sheet P close to normal temperature. The heat insulator 570 and the cooling fan 415 prevent the second conveyance belt 411 from being affected by the temperature rise of the first conveyance belt 511.

Next, transition of the water content of the liquid applied to the sheet P is described with reference to FIG. 9.

Figure 9:
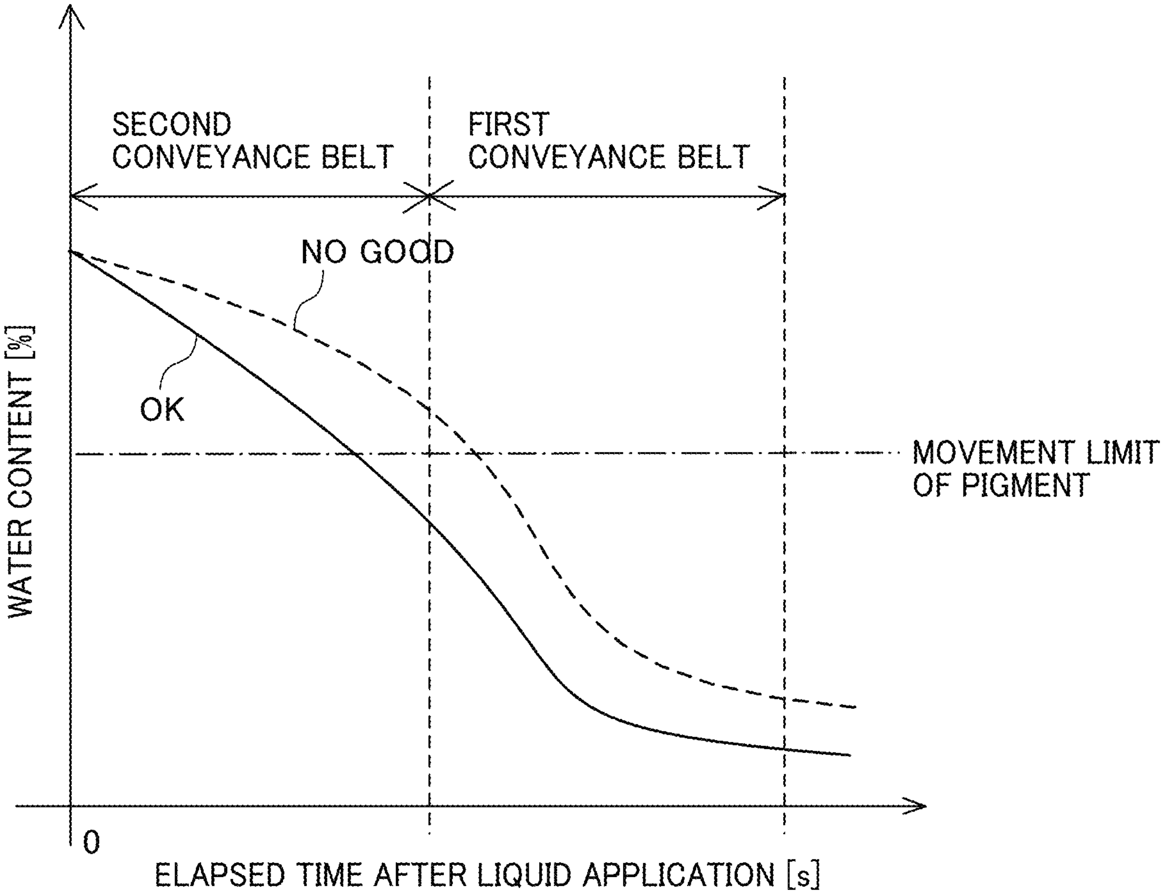
FIG. 9 is a graph illustrating an example of a relation between an elapsed time after printing and a water content in the liquid.

FIG. 9 is a graph illustrating an example of a relation between an elapsed time after printing and the water content in the ink.

In FIG. 9, a vertical axis represents a water content of an ink application portion (image portion) of the sheet P. A numerical value of "0" in a horizontal axis in FIG. 9 indicates a moment when the ink is dropped from the head 101 onto the sheet P. The horizontal axis represents an elapsed time after a printing process.

The pigment easily moves when the water content in the liquid (ink) is equal to or greater than a "movement limit of the pigment" as indicated by a dash-single-dot line in FIG. 9. The pigment does not move when the water content is equal to or lower than the movement limit of the pigment.

After the ink lands on the sheet P, if the water content decreases from a high water content to below the movement limit of the pigment during the sheet P is conveyed by the second conveyance belt 411, the sheet P can come into contact with the first conveyance belt 511 having a high temperature after the sheet is conveyed by the second conveyance belt 411 as indicated by a solid line of "OK" in FIG. 9.

Conversely, when the sheet P comes into contact with the first conveyance belt 511 while the water content in the liquid on the sheet P remains equal to or greater than the movement limit of the pigment, the density unevenness of the image on the sheet P occurs as indicated by a broken line of "NO GOOD" in FIG. 9.

To make the broken line of "NO GOOD" to the solid line of "OK", the section of the second conveyance belt 411 may be lengthened, or an evaporation of the moisture in the liquid (ink) on the sheet P may be promoted to reduce the water content in the liquid on the sheet P to be lower than the movement limit of the pigment.

If the section of the second conveyance belt 411 is lengthened, a size of the sheet heater 500 increases. Thus, it is preferable to apply heat to the sheet P to such a degree in which the cockling of the sheet P does not occur to shorten the second conveyance belt 411.

Therefore, the sheet heater 500 includes the preheater 301 to perform preheating to such the degree in which the cockling of the sheet P does not occur as described above.

The sheet heater 500 according to a fourth embodiment of the present disclosure is described with reference to FIG. 10.

Figure 10:
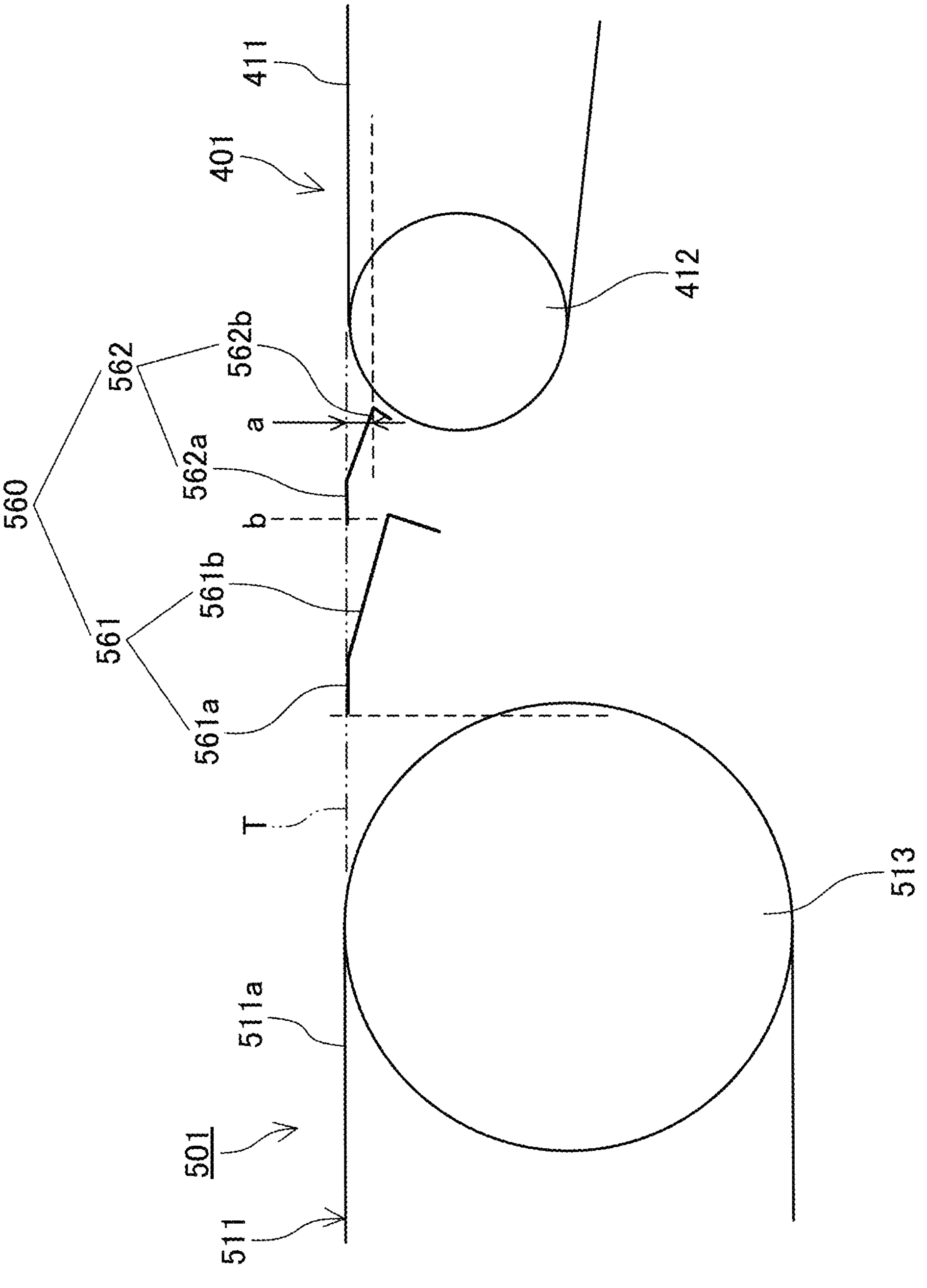
FIG. 10 is a schematic cross-sectional side view of a sheet heater according to a fourth embodiment of the present disclosure.

FIG. 10 is a schematic cross-sectional side view of the sheet heater 500 according to the fourth embodiment of the present disclosure.

A sheet heater 500 according to the fourth embodiment includes a guide 560 as a guide disposed between the second conveyance belt 411 and the first conveyance belt 511. The guide 560 includes a second guide 562 and a first guide 561. The second guide 562 is disposed upstream of the of the first guide 561 and downstream of the second conveyance belt 411. The first guide 561 is disposed downstream of the second guide 562 and upstream of the first conveyance belt 511.

The second guide 562 is disposed downstream of the second conveyance belt 411. Both sides of the second guide 562 crossing the conveyance direction are fixed by side plates. The second guide 562 receives the sheet P fed from the second conveyance belt 411 and guides the sheet P to the first guide 561.

The second guide 562 includes an inclined portion 562*b* and a second guide portion 562*a*. The inclined portion 562*b* serves as a first guide portion and is inclined upward from below from upstream of the second guide 562 toward downstream of the second guide 562 in the conveyance direction. The second guide portion 562*a* is horizontally aligned and is disposed downstream of the inclined portion 562*b*.

An upstream end of the inclined portion 562*b* of the second guide 562 is lower than a conveyance path T indicated by an imaginary line by a distance "a" as illustrated in FIG. 10. Thus, even if a leading end of the sheet P moves along an outer periphery of the drive roller 412, the inclined portion 562*b* of the second guide 562 can scoop up the leading end of the sheet P.

The first guide 561 is disposed downstream of the second guide 562 and upstream of the first conveyance belt 511. The first guide 561 guides the sheet P to the first conveyance belt 511.

Here, as indicated by a broken line "b", a downstream end of the second guide portion 562*a* of the second guide 562 in the conveyance direction is disposed immediately above an upstream end of the inclined portion 561*b* of the first guide 561 in the conveyance direction so that the sheet P is smoothly fed from the second guide 562 to the first guide 561.

The first guide 561 receives the sheet P conveyed along the second guide 562 and guides the sheet P to the first conveyance belt 511. The first guide 561 includes an inclined portion 561*b* and a second guide portion 561*a*. The inclined portion 561*b* serves as a first guide portion and is inclined upward from below from upstream of the first guide 561 toward downstream of the first guide 561 in the conveyance direction. The second guide portion 561*a* is horizontally aligned and is disposed downstream of the inclined portion 561*b*.

As described above, the downstream end of the second guide portion 562*a* of the second guide 562 in the conveyance direction is disposed immediately above the upstream end of the inclined portion 561*b* of the first guide 561 in the conveyance direction as illustrated by the broken line "b" in FIG. 10. Therefore, even if the leading end of the sheet P having passed through the second guide 562 hangs down, the sheet P can be reliably received by the inclined portion 561*b* of the first guide 561.

A direction of the second guide portion 561*a* of the first guide 561 is substantially the same as a direction of a belt surface 511*a* of the first conveyance belt 511. Thus, posture of the leading end of the sheet P becomes along the belt surface 511*a* so that the first guide 561 can prevent the sheet P from fluttering on the first conveyance belt 511 when the sheet P lands on the belt surface 511*a* of the first conveyance belt 511.

In the above manner, the first guide 561 can reduce waving (cockling) of the sheet P due to a difference in drying properties in the sheet P since it is possible to reduce a region in which the sheet P does not partially contact the belt surface 511*a* of the first conveyance belt 511.

The first guide 561 is horizontally movable parallel to the belt surface 511*a* of the first conveyance belt 511.

The first conveyance belt 511 is disposed downstream of the first guide 561.

The sheet heater 500 having such a configuration can smoothly conveys the sheet P from the second conveyance belt 411 to the first conveyance belt 511.

The sheet heater 500 according to a fifth embodiment of the present disclosure is described with reference to FIG. 11.

Figure 11:
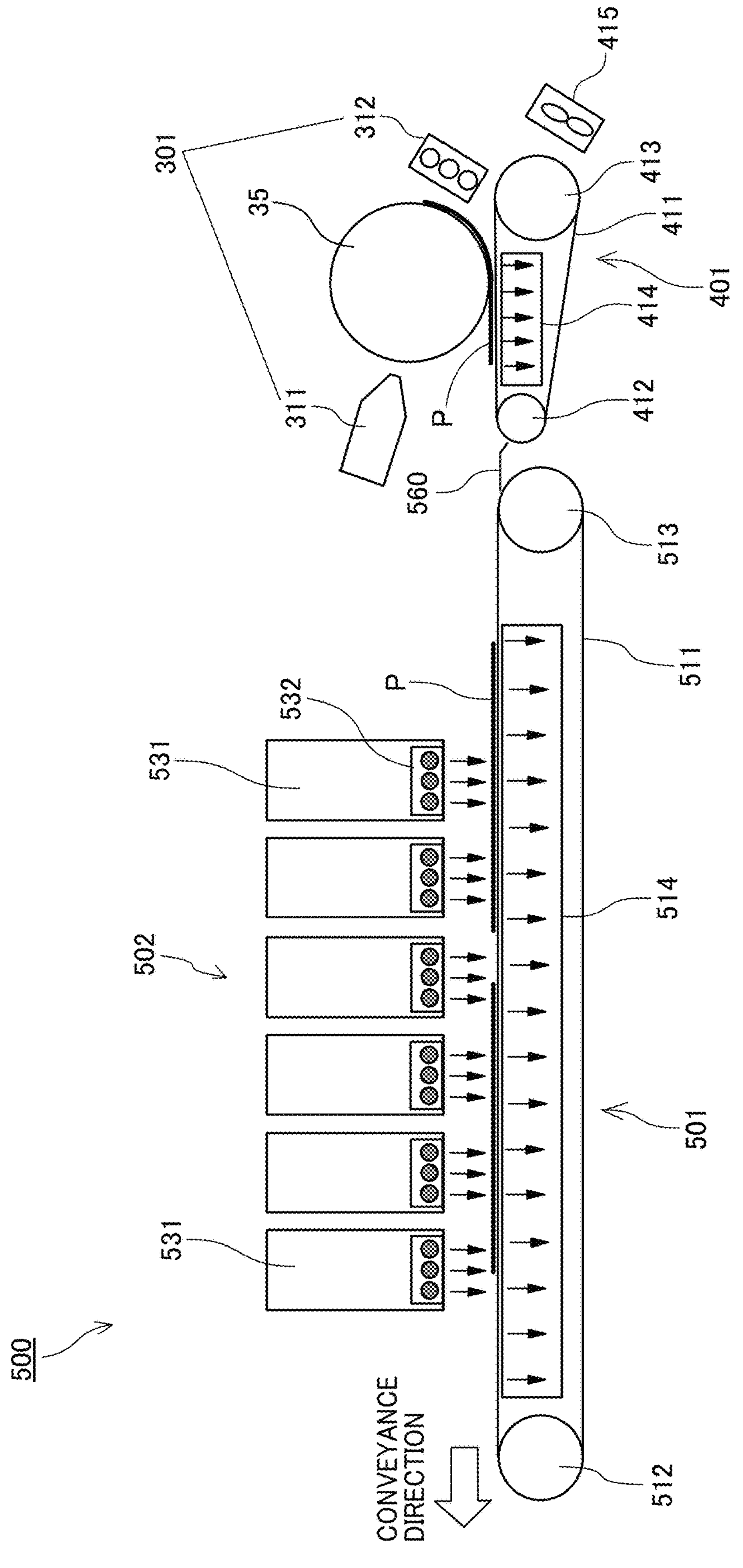
FIG. 11 is a schematic cross-sectional side view of a sheet heater according to a fifth embodiment of the present disclosure.

FIG. 11 is a schematic cross-sectional side view of the sheet heater 500 according to the fifth embodiment of the present disclosure.

The heating unit 502 of the sheet heater 500 includes an infrared irradiators 531. Each of the infrared irradiator 531 includes a near infrared heater 532 (NIR heater). The NIR heater 532 emits an infrared ray having a peak wavelength in a near infrared region (about 0.78 μm to 1.5 μm).

Moisture contained in the sheet P has large absorption bands in a vicinity of 1.5 μm, 1.9 μm, and 2.5 μm, and a total absorption gradually increases toward lower wavelengths. Therefore, the NIR heater 532 having a peak wavelength in a wavelength region of less than 1.5 μm can obtain the same effect as the ultraviolet irradiator 521.

Further, the NIR heater 532 can be used to heat the sheet P from a conveyance member side (first conveyance belt 511 side). Thus, the sheet heater 500 according to the fifth embodiment can reduce an output of the NIR heater 532 or reduce a number of NIR heaters 532.

A sheet heater 500 according to a sixth embodiment of the present disclosure is described with reference to FIG. 12.

Figure 12:
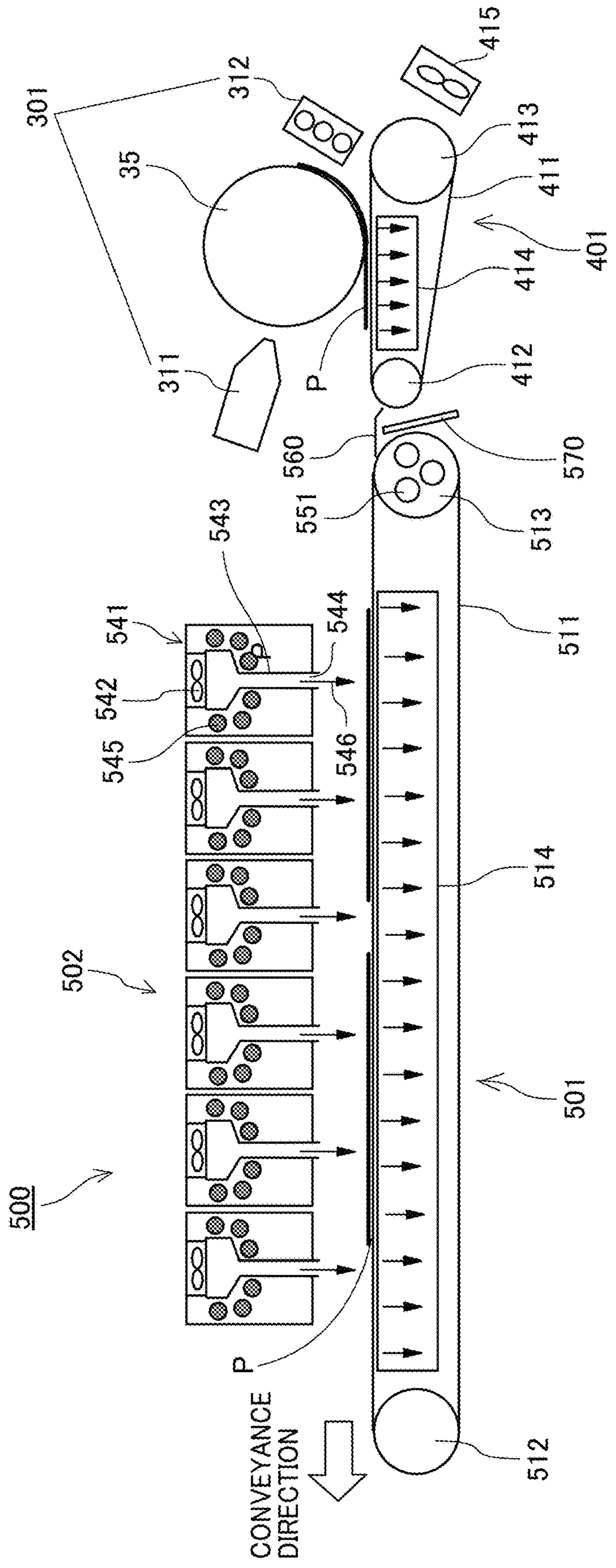
FIG. 12 is a schematic cross-sectional side view of a sheet heater according to a sixth embodiment of the present disclosure.

FIG. 12 is a schematic cross-sectional side view of the sheet heater 500 according to the sixth embodiment of the present disclosure.

The heating unit 502 of the sheet heater 500 includes air blowers 541. The air blower 541 includes a fan 542, a channel 543, a nozzle 544, and an infrared heater 545. The fan 542 sucks air outside the sheet heater 500. The nozzle 544 is also referred to as a "blowout port".

The air blower 541 heats the air taken inside the channel 543 by the fan 542 with the infrared heater 545 and blows a warm air 546 from the nozzle 544 toward the sheet P through the channel 543. Thus, the air blower 541 can reduce a vapor density in a vicinity of the sheet P to promote evaporation while raising the temperature of the solvent and moisture in the ink applied to the sheet P.

The sheet heater 500 according to the sixth embodiment applies the warm air 546 to a blank portion of the sheet P to evaporate the moisture in the blank portion. Thus, the sheet heater 500 according to the sixth embodiment can prevent excessive evaporation of the moisture in the ink and reduce waviness (wrinkles) of the sheet P as compared with a sheet heater 500 that uses the IR heater to directly applies the heat on an absorption wavelength of water.

Further, the sheet heater 500 using the air blower 541 can heat the sheet P from the first conveyance belt 511 (conveyance member) by the heating element 551. Thus, the sheet heater 500 using the air blower 541 can heat and dry the sheet P with a setting temperature of the air blower 541 lower than a setting temperature of the air blower 541 in which the air blower 541 does not warm (heat) the sheet P from the first conveyance belt 511 (conveyance member).

A sheet heater 500 according to a seventh embodiment of the present disclosure is described with reference to FIG. 13.

Figure 13:
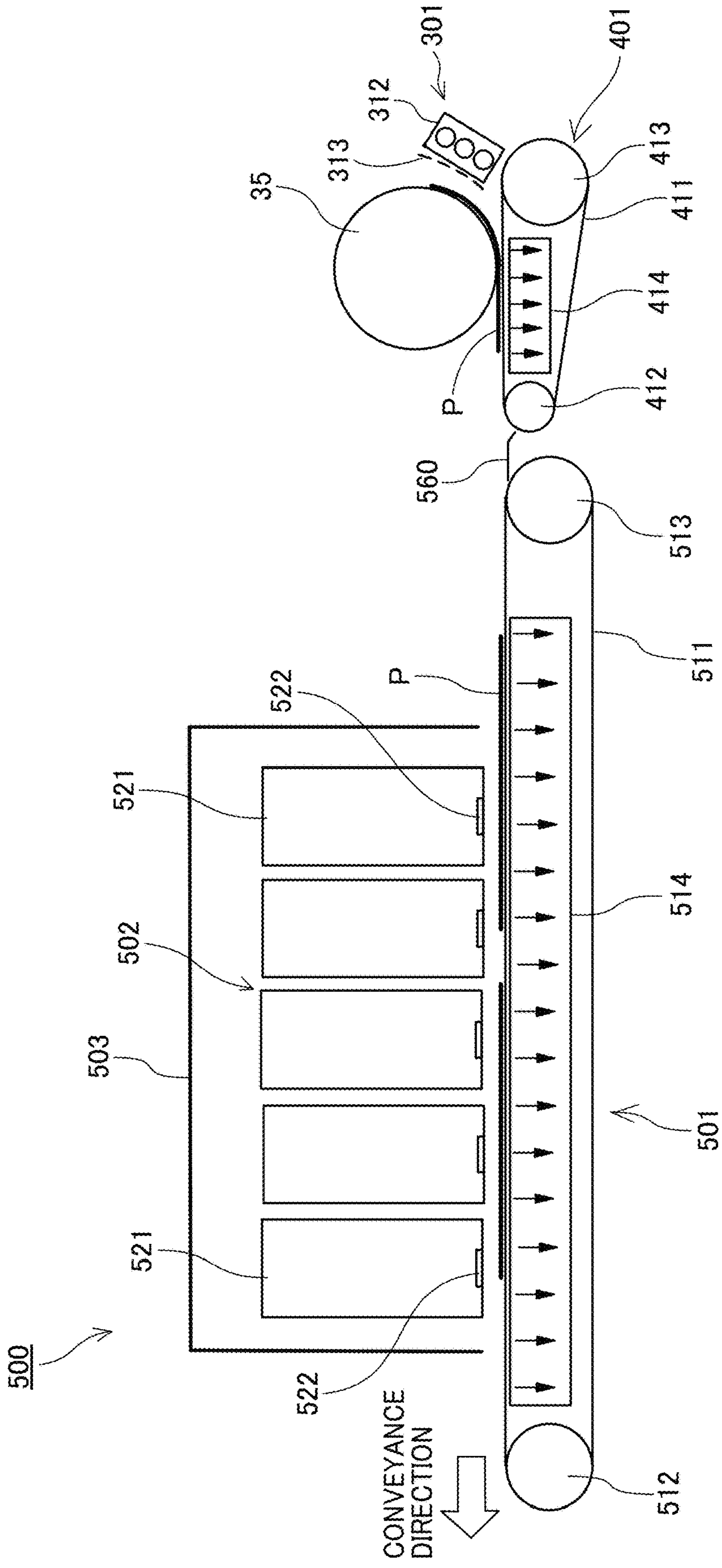
FIG. 13 is a schematic cross-sectional side view of a sheet heater according to a seventh embodiment of the present disclosure.

FIG. 13 is a schematic cross-sectional side view of the sheet heater 500 according to the seventh embodiment of the present disclosure.

The sheet heater 500 according to the seventh embodiment includes the preheater 301 configured by the infrared irradiator 312 and does not include the air blower 311 as described in the sheet heater 500 according to the first embodiment (see FIG. 3).

The sheet heater 500 according to the seventh embodiment uses the infrared irradiator 312 to heat the sheet P to such a degree in which the fluidity of the liquid applied to the sheet P is reduced.

Further, the sheet heater 500 includes a net 313 between the infrared irradiator 312 and the transfer cylinder 35. Thus, the net 313 prevents the sheet P from contacting the infrared irradiator 312 that pre-dries the sheet P when the sheet P is fed from the transfer cylinder 35 to the second conveyance belt 411 in the air.

Alternately, the sheet heater 500 may include a guide to guide both ends of the sheet P in the conveyance direction instead of the net 313. The guide prevents the sheet P from contacting the infrared irradiator 312. The guide may be rotatable or non-rotatable.

Further, the preheater 301 may be disposed upstream of the suction chamber 414 inside the second conveyance belt 411 to preheat the sheet P via the second conveyance belt 411.

A sheet heater 500 according to an eighth embodiment of the present disclosure is described with reference to FIG. 14.

Figure 14:
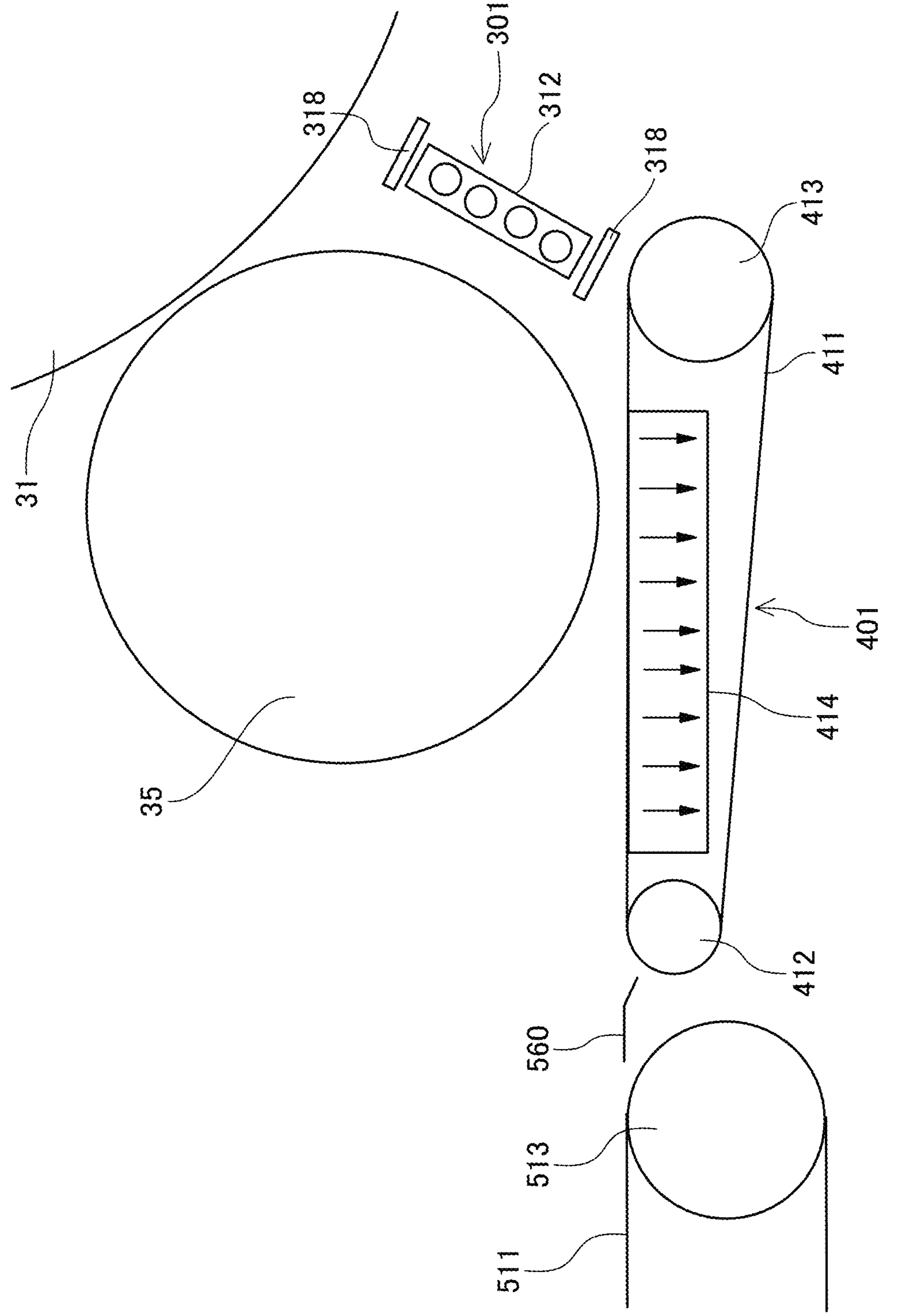
FIG. 14 is a schematic cross-sectional side view of a sheet heater according to an eighth embodiment of the present disclosure.

FIG. 14 is a schematic cross-sectional side view of the sheet heater 500 according to the eighth embodiment of the present disclosure.

The sheet heater 500 according to the eighth embodiment includes a heat insulator 318 as a heat insulator between the infrared irradiator 312 and the second conveyance belt 411. The sheet heater 500 also include the heat insulator 318 between the infrared irradiator 312 and the drum 31.

The heat insulator 318 prevents the second conveyance belt 411 and the drum 31 from being heated by the infrared irradiator 312, thereby reducing the density unevenness in the image on the sheet P.

The suction chamber 414 continues to suck the air at least during the printing process. Since the air sucked by the suction chamber 414 has an ambient temperature of normal temperature, the second conveyance belt 411 can be cooled between the sheets P continuously conveyed.

A sheet heater 500 according to a ninth embodiment of the present disclosure is described with reference to FIGS. 15 and 16.

Figure 15:
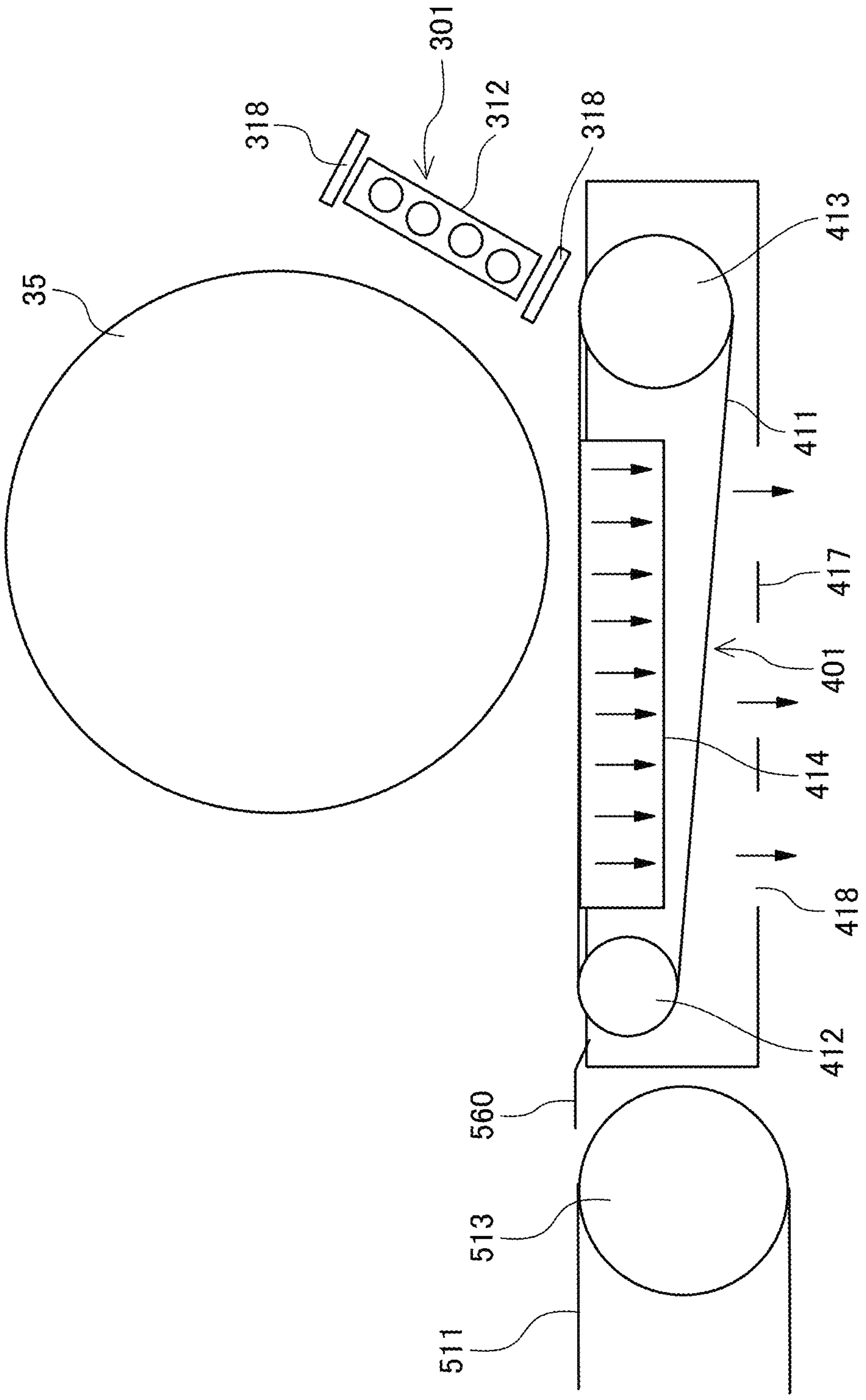
FIG. 15 is a schematic cross-sectional side view of a sheet heater according to a ninth embodiment of the present disclosure.

FIG. 15 is a schematic cross-sectional side view of the sheet heater 500 according to the ninth embodiment of the present disclosure.

Figure 16:
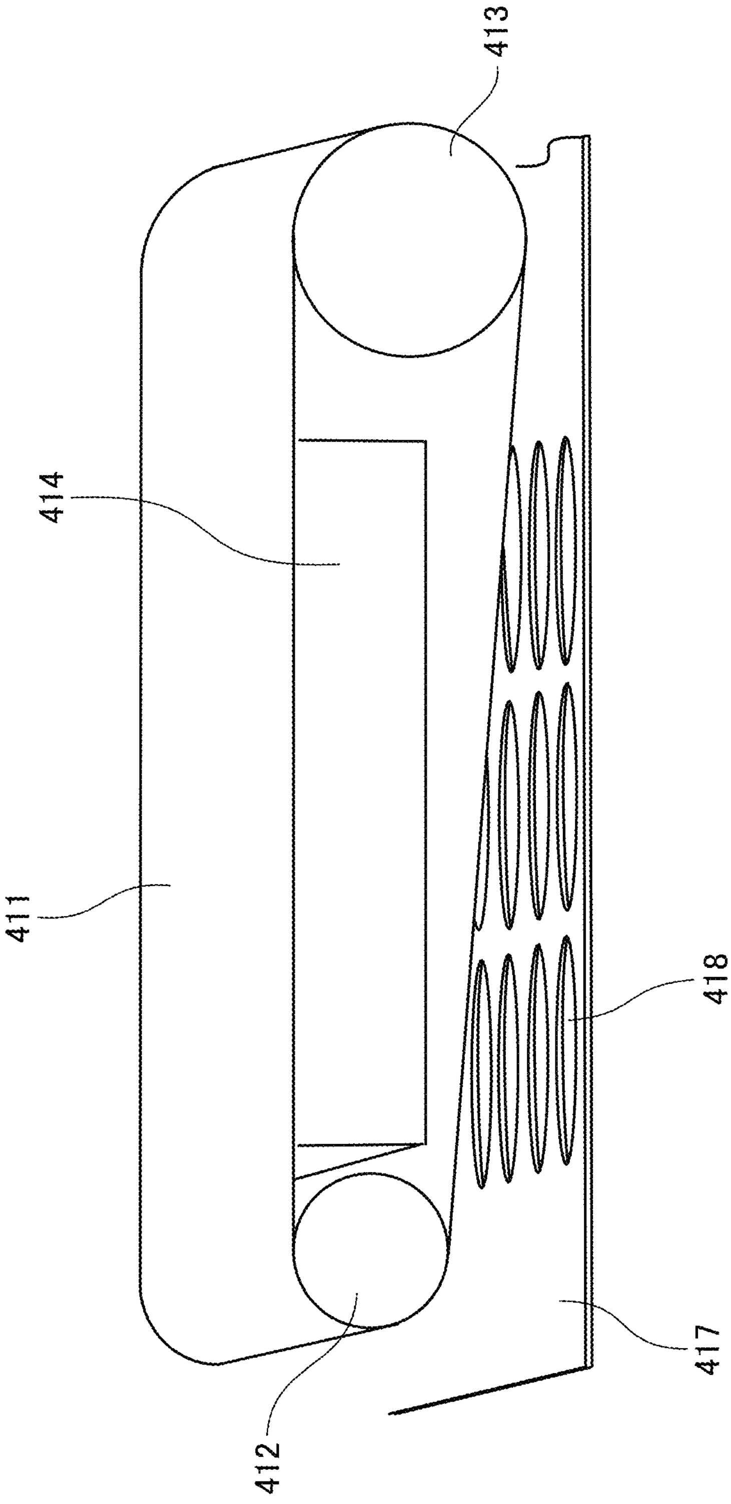
FIG. 16 is an enlarged schematic perspective view of a main part of the sheet heater according the ninth embodiment of the present disclosure.

FIG. 16 is an enlarged schematic perspective view of a main part of the sheet heater 500 according the ninth embodiment.

The sheet heater 500 according to the ninth embodiment includes openings 418 serving as exhaust ports in a bottom surface of a housing 417 (case). The housing 417 accommodates the second conveyance mechanism 401.

Accordingly, the air sucked by the suction chamber 414 of the second conveyance mechanism 401 passes through the opening 418 of the second conveyance belt 411. The opening 418 may be a suction port, a mesh opening, or the like. Then, the air is discharged from the opening 418 of the housing 417 into the printer 1.

Here, the suction chamber 414 of the second conveyance mechanism 401 is a cooler that cools the second conveyance belt 411. In the conveyance path of the sheet P, the cooler (suction chamber 414) of the second conveyance mechanism 401 (second conveyor 41) is disposed between the liquid application unit (discharge unit 33) and the heating unit 502 (heating device 52) as illustrated in FIG. 1.

As described above, the sheet heater 500 according to the ninth embodiment includes the cooler (suction chamber 414) to cool the second conveyance belt 411 (second conveyor 41), and the cooler (suction chamber 414) is disposed between the liquid application unit (discharge unit 33) and the heating unit 502 (heating device 52) in the conveyance path of the sheet P.

The cooler (suction chamber 414) faces a first surface (lower surface in FIG. 15) of the second conveyance belt 411 opposite to a second surface (upper surface in FIG. 15) of the second conveyance belt 411 on which the sheet P contacts.

Thus, the sheet heater 500 according to the ninth embodiment can conveys the sheet P onto which the liquid has been applied by the second conveyance belt 411 with low temperature before the sheet P is heated by the heating unit 502. Thus, the sheet heater 500 according to the ninth embodiment can reduce the density unevenness of the image on the sheet P.

The cooler (suction chamber 414) may include a suction fan (suction chamber 414), an air blower (cooling fan), a controller to increase a number of rotations of the second conveyance belt 411, and other devices to reduce temperature rise.

The sheet heater 500 according to a tenth embodiment of the present disclosure is described with reference to FIG. 17.

Figure 17:
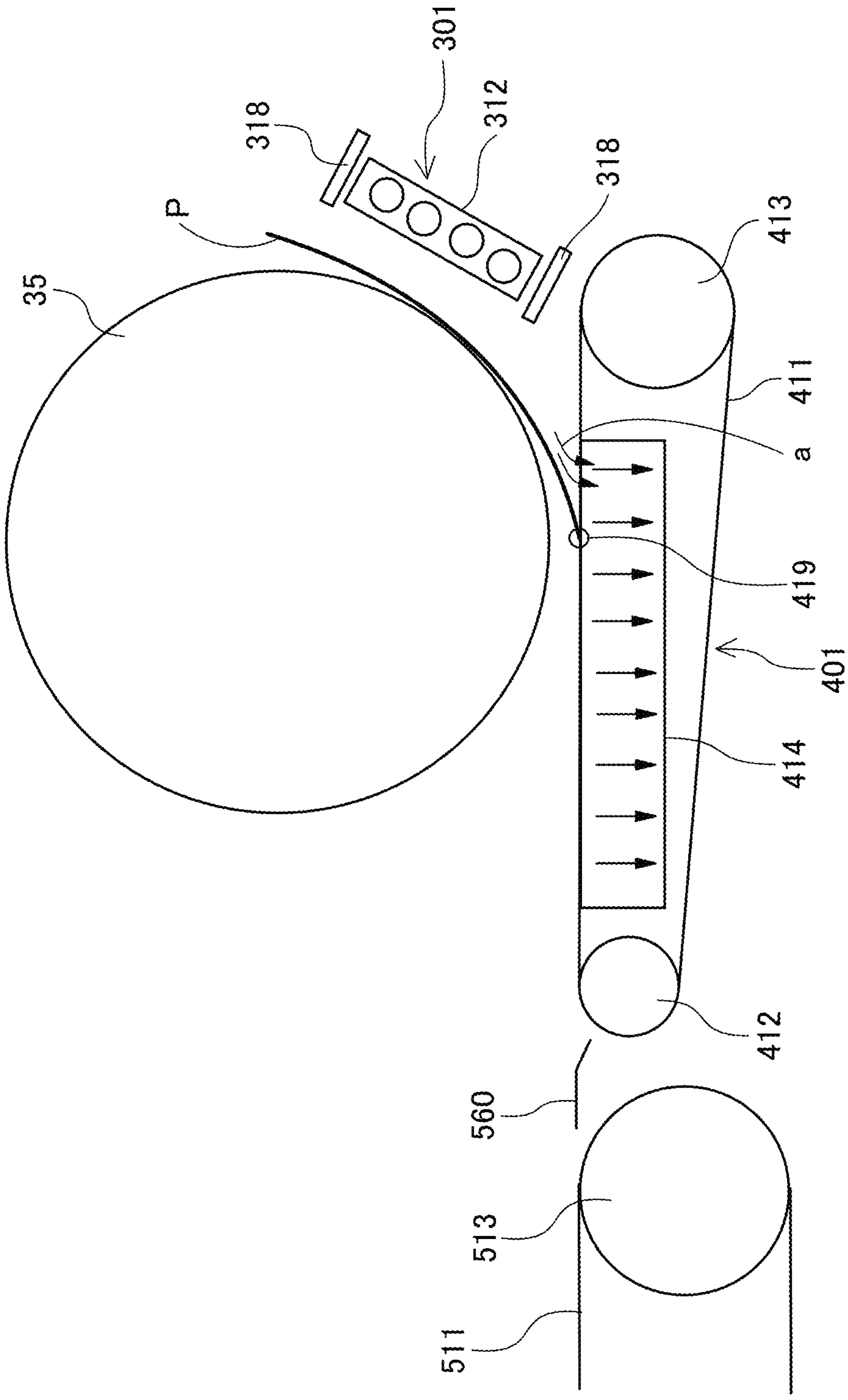
FIG. 17 is a schematic cross-sectional side view of a sheet heater according to a tenth embodiment of the present disclosure.

FIG. 17 is a schematic cross-sectional side view of the sheet heater 500 according to the tenth embodiment of the present disclosure.

The sheet heater 500 according to the tenth embodiment includes the suction chamber 414 to cool the second conveyance belt 411. The suction chamber 414 sections air "a" to cool the second conveyance belt 411 at a position upstream of a position 419. The sheet P fed from the transfer cylinder 35 to the second conveyance belt 411 lands on the second conveyance belt 411 at the position 419.

The sheet heater 500 according to the tenth embodiment prevents the sheet P preheated by the preheater 301 from reaching a high temperature immediately after landing on the second conveyance belt 411.

Air flow sucked by the suction chamber 414 flows outside the printer 1 and is exhausted outside a building through a facility duct of the building. Air flow sucked by the suction chamber 514 of the first conveyance belt 511 also flows outside the printer 1 and is exhausted outside the building through the facility duct of the building.

The suction chamber 414 is arranged inside the printer 1. The first conveyance belt 511 is disposed downstream of the second conveyance belt 411 in the conveyance direction, and the surface temperature of the first conveyance belt 511 is higher than the surface temperature of the second conveyance belt 411.

The sheet heaters 500 in each of the above-described embodiments can be applied to the printer 1 as the liquid discharge apparatus as described in the first embodiment as illustrated in FIG. 1.

In the present embodiments, a "liquid" discharged from the head is not particularly limited as long as the liquid has a viscosity and surface tension of degrees dischargeable from the head.

However, preferably, the viscosity of the liquid is not greater than 30 mPa·s under ordinary temperature and ordinary pressure or by heating or cooling.

Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant.

Such a solution, a suspension, or an emulsion can be used for, e.g., inkjet ink, surface treatment solution, a liquid for forming components of electronic element or light-emitting element or a resist pattern of electronic circuit, or a material solution for three-dimensional fabrication.

Further, the water-based pigment ink is not limited to the above-mentioned embodiments and may contain an ultraviolet polymerization initiator and an ultraviolet polymerizable compound. In this case, the water-based pigment ink preferably contains the ultraviolet polymerization initiator and the ultraviolet polymerizable, content of which does not cause or hardly cause curing due to a polymerization reaction even when the heater irradiates the water-based pigment ink with light.

Specifically, the content of the ultraviolet polymerization initiator in an ink composition is less than 0.1% by mass, or the content of the ultraviolet polymerizable compound in the ink composition is less than 5% by mass. Such a configuration of the water-based pigment ink can reduce a running cost and obtain a printed matter having good safety.

The ultraviolet polymerizable compound may be a monomer or an oligomer. Examples of the ultraviolet polymerizable compound include methacrylic acid.

Examples of an energy source to generate energy to discharge liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

Examples of the "liquid discharge apparatus" include, not only apparatuses capable of discharging liquid to materials to which liquid can adhere, but also apparatuses to discharge a liquid toward gas or into a liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink.

The liquid discharge apparatus is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material onto which liquid can adhere" represents a material onto which liquid at least temporarily adheres, a material onto which liquid adheres and fixes, or a material onto which liquid adheres to permeate.

Examples of the "material onto which liquid can adhere" include recording media such as a paper sheet, recording paper, and a recording sheet of paper, film, and cloth, electronic components such as an electronic substrate and a piezoelectric element, and media such as a powder layer, an organ model, and a testing cell.

The "material onto which liquid can adhere" includes any material on which liquid adheres unless particularly limited.

Examples of the "material onto which liquid can adhere" include any materials on which liquid can adhere even temporarily, such as paper, thread, fiber, fabric, leather, metal, plastic, glass, wood, and ceramic.

The liquid discharge apparatus may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet to coat the treatment liquid on a sheet surface to reform the sheet surface, and an injection granulation apparatus in which a composition liquid including raw materials dispersed in a solution is injected through nozzles to granulate fine particles of the raw materials.

The terms "image formation", "recording", "printing", "image printing", and "fabricating" used in the present embodiments may be used synonymously with each other.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

What is claimed is:

1. A sheet heater comprising:

a first conveyance belt to convey a sheet on which a liquid has been discharged in a conveyance direction;

a heater facing the first conveyance belt to heat the sheet conveyed by the first conveyance belt; and a second conveyance belt disposed upstream of the first conveyance belt in the conveyance direction to convey the sheet to the first conveyance belt, wherein air sucking the sheet on the second conveyance belt is blown to a returning path of the second conveyance belt so as to cool the second conveyance belt, and a surface temperature of the second conveyance belt is lower than a surface temperature of the first conveyance belt when the first conveyance belt and the second conveyance belt convey the sheet.

2. The sheet heater according to claim 1, wherein the surface temperature of the second conveyance belt is equal to or higher than an ambient temperature when the first conveyance belt and the second conveyance belt convey the sheet.

3. The sheet heater according to claim 1, further comprising:

a preheater to heat the sheet upstream of the second conveyance belt in the conveyance direction.

4. The sheet heater according to claim 3, wherein the preheater is a non-contact heater to heat the sheet without contacting the sheet.

5. The sheet heater according to claim 4, wherein the preheater includes:

an infrared irradiator to heat the sheet with infrared ray; and a heat insulator between the second conveyance belt and the infrared irradiator.

6. The sheet heater according to claim 4, wherein the preheater includes an air blower to blow air to dry the sheet.

7. The sheet heater according to claim 1, further comprising:

a heat insulator between the second conveyance belt and the first conveyance belt.

8. The sheet heater according to claim 1, further comprising:

a guide to guide the sheet from the second conveyance belt to the first conveyance belt, wherein the first conveyance belt and the second conveyance belt are separated from each other in the conveyance direction, and the guide is between the second conveyance belt and the first conveyance belt in the conveyance direction.

9. A sheet heater, comprising:

a first conveyance belt to convey a sheet on which a liquid has been discharged in a conveyance direction;

a heater facing the first conveyance belt to heat the sheet conveyed by the first conveyance belt;

a second conveyance belt disposed upstream of the first conveyance belt in the conveyance direction to convey the sheet to the first conveyance belt;

a guide to guide the sheet from the second conveyance belt to the first conveyance belt;

two or more rollers around which the first conveyance belt is wound; and a heating structure inside at least one of the two or more rollers to heat said at least one of the two or more rollers, wherein a surface temperature of the second conveyance belt is lower than a surface temperature of the first conveyance belt when the first conveyance belt and the second conveyance belt convey the sheet, the first conveyance belt and the second conveyance belt are separated from each other in the conveyance direction, and the guide is between the second conveyance belt and the first conveyance belt in the conveyance direction.

10. A liquid discharge apparatus comprising:

a liquid application device configured to apply a liquid onto a sheet; and the sheet heater according to claim 1.

11. The liquid discharge apparatus according to claim 10, further comprising:

a drum facing the liquid application device and disposed upstream from the second conveyance belt in the conveyance direction, the drum configured to convey the sheet onto which the liquid has been applied by the liquid application device toward the second conveyance belt.

12. A liquid discharge apparatus, comprising:

a liquid application structure to apply a liquid onto a sheet;

a sheet heater comprising:

a first conveyance belt to convey a sheet on which a liquid has been discharged in a conveyance direction, a heater facing the first conveyance belt to heat the sheet conveyed by the first conveyance belt, and a second conveyance belt disposed upstream of the first conveyance belt in the conveyance direction to convey the sheet to the first conveyance belt, wherein a surface temperature of the second conveyance belt is lower than a surface temperature of the first conveyance belt when the first conveyance belt and the second conveyance belt convey the sheet;

a drum facing the liquid application structure and disposed upstream from the second conveyance belt in the conveyance direction;

the drum configured to convey the sheet onto which the liquid has been applied by the liquid application structure toward the second conveyance belt;

a transfer cylinder between the drum and the second conveyance belt to convey the sheet from the drum to the second conveyance belt; and a preheater facing the transfer cylinder to heat the sheet upstream of the second conveyance belt.

13. The liquid discharge apparatus according to claim 12, wherein the preheater includes:

an air blower configured to blow air toward the transfer cylinder; and an infrared irradiator disposed opposite to the air blower via the transfer cylinder, the infrared irradiator configured to heat the sheet with infrared ray.

14. The liquid discharge apparatus according to claim 11, further comprising:

a cooler configured to cool the second conveyance belt, wherein the second conveyance belt is between the liquid application device and the sheet heater in the conveyance direction, and the cooler faces a first surface of the second conveyance belt opposite to a second surface of the second conveyance belt configured to contact the sheet.

15. The liquid discharge apparatus according to claim 14, wherein the cooler is a suction chamber configured to suction the sheet toward the second conveyance belt, and the suction chamber suctions air upstream of a position at which the sheet conveyed to the second conveyance belt comes into contact with the second conveyance belt.

16. A printer comprising:

a liquid application device configured to apply a liquid onto a sheet; and the sheet heater according to claim 1.

17. The printer according to claim 16, further comprising:

a drum facing the liquid application device and disposed upstream from the second conveyance belt in the conveyance direction, the drum configured to convey the sheet onto which the liquid has been applied by the liquid application device toward the second conveyance belt.

* * * * *